(12) United States Patent
Frossard et al.

(10) Patent No.: US 11,926,337 B2
(45) Date of Patent: *Mar. 12, 2024

(54) SYSTEM AND METHOD FOR DETERMINING OBJECT INTENTION THROUGH VISUAL ATTRIBUTES

(71) Applicant: UATC, LLC, Mountain View, CA (US)

(72) Inventors: Davi Eugenio Nascimento Frossard, Toronto (CA); Eric Randall Kee, Pittsburgh, PA (US); Raquel Urtasun, Toronto (CA)

(73) Assignee: UATC, LLC, Mountain View, CA (US)

( * ) Notice: Subject to any disclaimer, the term of this patent is extended or adjusted under 35 U.S.C. 154(b) by 9 days.

This patent is subject to a terminal disclaimer.

(21) Appl. No.: 17/731,722

(22) Filed: Apr. 28, 2022

(65) Prior Publication Data
US 2022/0292844 A1 Sep. 15, 2022

Related U.S. Application Data

(63) Continuation of application No. 16/286,160, filed on Feb. 26, 2019, now Pat. No. 11,341,356.
(Continued)

(51) Int. Cl.
*B60W 50/14* (2020.01)
*G05D 1/00* (2006.01)
(Continued)

(52) U.S. Cl.
CPC .......... *B60W 50/14* (2013.01); *G05D 1/0088* (2013.01); *G05D 1/0246* (2013.01); *G06V 10/25* (2022.01);
(Continued)

(58) Field of Classification Search
USPC .................................................. 382/103, 104
See application file for complete search history.

(56) References Cited

U.S. PATENT DOCUMENTS

| 8,977,007 | B1 | 3/2015 | Ferguson |
| 9,014,905 | B1 | 4/2015 | Kretzschmar |

(Continued)

OTHER PUBLICATIONS

Ba et al., "Layer Normalization", Machine Learning, Jul. 2016.
(Continued)

*Primary Examiner* — Ishrat I Sherali
(74) *Attorney, Agent, or Firm* — Dority & Manning, P.A.

(57) ABSTRACT

Systems and methods for determining object intentions through visual attributes are provided. A method can include determining, by a computing system, one or more regions of interest. The regions of interest can be associated with surrounding environment of a first vehicle. The method can include determining, by a computing system, spatial features and temporal features associated with the regions of interest. The spatial features can be indicative of a vehicle orientation associated with a vehicle of interest. The temporal features can be indicative of a semantic state associated with signal lights of the vehicle of interest. The method can include determining, by the computing system, a vehicle intention. The vehicle intention can be based on the spatial and temporal features. The method can include initiating, by the computing system, an action. The action can be based on the vehicle intention.

20 Claims, 7 Drawing Sheets

Related U.S. Application Data

(60) Provisional application No. 62/754,942, filed on Nov. 2, 2018, provisional application No. 62/685,714, filed on Jun. 15, 2018.

(51) Int. Cl.
  *G05D 1/02* (2020.01)
  *G06V 10/25* (2022.01)
  *G06V 10/764* (2022.01)
  *G06V 10/82* (2022.01)
  *G06V 20/58* (2022.01)

(52) U.S. Cl.
  CPC ............ *G06V 10/764* (2022.01); *G06V 10/82* (2022.01); *G06V 20/584* (2022.01); *G05D 2201/0213* (2013.01)

(56) References Cited

U.S. PATENT DOCUMENTS

| | | | |
|---|---|---|---|
| 10,061,322 | B1 | 8/2018 | Palefsky-Smith |
| 10,691,962 | B2 * | 6/2020 | Mei ..................... G06V 10/454 |
| 11,341,356 | B2 * | 5/2022 | Frossard ............. G06V 10/764 |
| 2013/0085976 | A1 | 4/2013 | Bone |
| 2017/0174261 | A1 | 6/2017 | Micks |
| 2017/0364758 | A1 | 12/2017 | Minster |
| 2018/0144202 | A1 | 5/2018 | Moosaei |
| 2019/0071091 | A1 | 3/2019 | Zhu |
| 2019/0087672 | A1 * | 3/2019 | Wang ..................... G06F 18/25 |
| 2019/0092318 | A1 | 3/2019 | Mei et al. |
| 2019/0205668 | A1 | 7/2019 | Noda |
| 2019/0354786 | A1 * | 11/2019 | Lee ........................ G06N 3/084 |

OTHER PUBLICATIONS

Baccouche et al., "Sequential Deep Learning for Human Action Recognition", International Workshop on Human Behavior Understanding, 2011, DD. 29-39.

Bai et al., "Deep Washed Transform for Instance Segmentation", 2017 IEEE Conference on Computer Vision and Pattern Recognition, Jul. 2017, DD. 2858-2866.

Casares et al., "A Robust Algorithm for the Detection of Vehicle Turn Signals and Brake Lights", 2012 IEEE Ninth International Conference on Advanced Video and Signal-Based Surveillance, Sep. 2012, DD. 386-391.

Chabot et al., "Deep MANTA: A Coarse-to-Fine Many-Task Network for Joint 2D and 3D Vehicle Analysis from Monocular Image", 2017 IEEE Conference on Computer Vision and Pattern Recognition, Jul. 2017, DD. 1827-1836.

Chen et al., "Multi-view 3D Object Detection Network for Autonomous Driving", 2017 IEEE Conference on Computer Vision and Pattern Recognition, Jul. 2017, DD. 6526-6534.

Chen et al., "Turn Signal Detection During Nighttime by CNN Detector and Perceptual Hashing Tracking", IEEE Transactions on Intelligent Transportation Systems, vol. 18, Issue 12, Apr. 2017, pp. 3303-3314.

Cordts et al., "The Cityscapes Dataset for Semantic Urban Scene Understanding", 2016 IEEE Conference on Computer Vision and Pattern Recognition, Jun. 2017, DD. 3213-3223.

Donahue et al., "Long-Term Recurrent Convolutional Networks for Visual Recognition and Description", IEEE Transactions on Pattern Analysis and Machine Intelligence, vol. 39, Issue 4, Apr. 2017, DD. 677-691.

Frohlich et al., "Will this car change the lane?—Turn signal recognition in the frequency domain", 2014 IEEE Intelligent Vehicles Symposium Proceedings, Jun. 2014, DD. 37-42.

Frossard et al., "End-to-end Learning of Multi-sensor 3D Tracking by Detection", 2018 IEEE International Conference on Robotics and Automation, May 2018, DD. 635-642.

Frossard et al., "DepSignals: Predicting Intent of Drivers Through Visual Signals", arxiv.org, Cornell University Library, Ithaca, New York, May 3, 2019, XP081272081, 8 pages.

Geiger et al., "Are we ready for autonomous driving? The KITTI vision benchmark suite", 2012 IEEE Conference on Computer Vision and Pattern Recognition, Jun. 2012, DD. 3354-3361.

He et al., "Mask R-CNN", 2017 IEEE International Conference on Computer Vision, Oct. 2017, pp. 2980-2988.

International Search Report and Written Opinion for PCT/US2019/037222, dated Aug. 8, 2019, 11 pages.

Ji et al., "3D Convolutional Neural Networks for Human Action Recognition", IEEE Transactions on Pattern Analysis and Machine Intelligence, vol. 35, Issue 1, Jan. 2013, pp. 221-231.

Kendall et al., "End-to-End Learning of Geometry and Context for Deep Stereo Regression", 2017 IEEE International Conference on Computer Vision, Oct. 2017, DD. 66-75.

Kingma et al., "Adam: A Method for Stochastic Optimization", Machine Learning, Dec. 2014.

Lee et al., "Multi-Class Multi-Object Tracking using Changing Point Detection", European Conference on Computer Vision, Aug. 2016, DD 68-83.

Liu et al., "SGN: Sequential Grouping Networks for Instance Segmentation", 2017 IEEE International Conference on Computer Vision, Oct. 2017, pp. 3516-3524.

Ng et al., "Beyond short snippets: Deep networks for video classification", 2015 IEEE Conference on Computer Vision and Pattern Recognition, Jun. 2015, DD. 4694-4702.

Pang et al., "Cascade Residual Learning: A Two-Stage Convolutional Neural Network for Stereo Matching", 2017 IEEE International Conference on Computer Vision Workshops, Oct. 2017, pp. 878-886.

Ren et al., "Accurate Single Stage Detector Using Recurrent Rolling Convolution", 2017 IEEE Conference on Computer Vision and Pattern Recognition, Jul. 2017, DD. 752-760.

Satzoda et al., "Looking at Vehicles in the Night: Detection and Dynamics of Rear Lights", IEEE Transactions on Intelligent Transportation Systems, Nov. 2016, DD. 1-11.

Seki et al., "SGM-Nets: Semi-Global Matching with Neural Networks", 2017 IEEE Conference on Computer Vision and Pattern Recognition, Jul. 2017, nn. 6640-6649.

Shi et al., "Convolutional LSTM Network: A Machine Learning Approach for Precipitation Nowcasting", Advances in neural information processing systems, Jun. 2015, pp. 802-810.

Simonyan et al., "Two-Stream Convolutional Networks for Action Recognition in Videos", Advances in neural information processing systems, Nov. 2014.

Simonyan et al., "Very Deep Convolutional Networks for Large-Scale Image Recognition", Computer Vision and Pattern Recognition, Sep. 2014.

Wang et al., "Real-Time Vehicle Signal Lights Recognition with HDR Camera", 2016 IEEE International Conference on Internet of Things and IEEE Green Computing and IEEE Smart Data, IEEE, Dec. 15, 2016, XP033093003, 4 pages.

Xiang et al., "Subcategory-Aware Convolutional Neural Networks for Object Proposals and Detection", 2017 IEEE Winter Conference on Applications of Computer Vision, Mar. 2017 pp. 924-933.

Yeung et al., "End-to-End Learning of Action Detection from Frame Glimpses in Videos", 2016 IEEE Conference on Computer Vision and Pattern Recognition, Jun. 2016, DD. 2678-2687.

Zhao et al., "Pyramid Scene Parsing Network", 2017 IEEE Conference on Computer Vision and Pattern Recognition, Jul. 2017, pp. 6230-6239.

* cited by examiner

SYSTEM AND METHOD FOR DETERMINING OBJECT INTENTION THROUGH VISUAL ATTRIBUTES

PRIORITY CLAIM

The present application is a continuation of U.S. application Ser. No. 16/286,160 having a filing date of Feb. 26, 2019, which claims the benefit of U.S. Provisional Application 62/685,714 having a filing date of Jun. 15, 2018 and U.S. Provisional Application 62/754,942 having a filing date of Nov. 2, 2018. Applicant claims priority to and the benefit of each of such applications and incorporate all such applications herein by reference in its entirety.

FIELD

The present disclosure relates generally to controlling vehicles. In particular, a vehicle can be controlled to determine object intentions through visual attributes.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method of determining semantic vehicle intentions. The method includes obtaining, by a computing system including one or more computing devices, sensor data associated with a surrounding environment of a first vehicle. The sensor data includes a sequence of image frames, each image frame corresponding to one of a plurality of time steps. The method includes determining, by the computing system, one or more regions of interest associated with the sensor data. The method includes determining, by the computing system, one or more spatial features associated with at least one of the one or more regions of interest. At least one of the one or more spatial features are indicative of a vehicle orientation associated with a vehicle of interest. The method includes determining, by the computing system, one or more temporal features associated with at least one of the one or more regions of interest. The one or more temporal features are indicative of one or more semantic states associated with at least one signal light of the vehicle of interest. The method includes determining, by the computing system, an intention associated with the vehicle of interest based, at least in part, on the one or more spatial features and the one or more temporal features. The method includes initiating, by the computing system, one or more actions based, at least in part, on the intention.

Another example aspect of the present disclosure is directed to a computing system including one or more processors and one or more tangible, non-transitory, computer readable media that collectively store instructions that when executed by the one or more processors cause the computing system to perform operations. The operations include obtaining sensor data associated with a surrounding environment of a first vehicle. The operations include determining, via one or more machine learning models, one or more regions of interest associated with the sensor data. The operations include determining, via one or more machine learning models, one or more spatial features associated with at least one of the one or more regions of interest. At least one of the one or more spatial features are indicative of an object orientation associated with an object of interest. The operations include determining, via one or more machine learning models, one or more temporal features associated with at least one of the one or more regions of interest. The one or more temporal features are indicative of one or more semantic states associated with at least one signal of the object of interest. The operations include determining, via one or more machine learning models, an intention associated with the object of interest based, at least in part, on the one or more spatial features and the one or more temporal features. The operations include initiating one or more actions based, at least in part, on the intention.

Yet another aspect of the present disclosure is directed to an autonomous vehicle. The autonomous vehicle includes one or more vehicle sensors, one or more processors, and one or more tangible, non-transitory, computer readable media that collectively store instructions that when executed by the one or more processors cause the one or more processors to perform operations. The operations include obtaining, via the one or more vehicle sensors, sensor data associated with a surrounding environment of the autonomous vehicle. The sensor data includes a sequence of image frames at each of a plurality of time steps. The operations include determining a region of interest associated with the sensor data. The operations include determining one or more spatial features associated with the one or more region of interest. The operations include determining one or more temporal features associated with the region of interest. The operations include determining an intention associated with a vehicle of interest based, at least in part, on the one or more spatial features and the one or more temporal features. The operations include initiating one or more actions based, at least in part, on the intention.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which.

DETAILED DESCRIPTION

Figure 1:
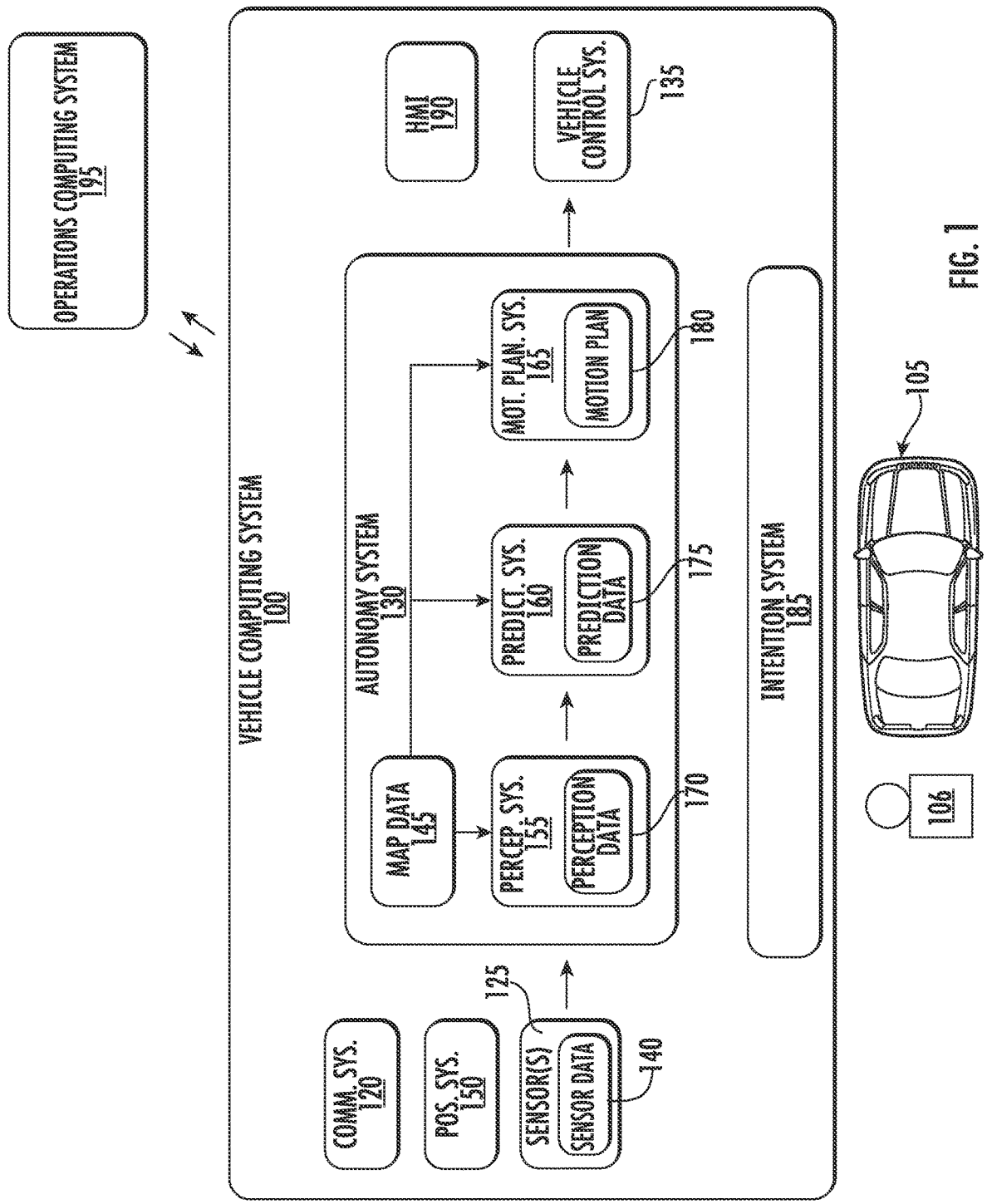
FIG. 1 depicts an example system overview according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for determining vehicle intention through visual attributes. For example, vehicle intention can be communicated by signal lights and can include a future left turn, right turn, and/or an emergency. For safe operation, it is important for vehicles to reliably determine the intention of other vehicles, as communicated by signal lights, within their surrounding environment. Accurate predictions of vehicle intention can help guide a vehicle's detection and tracking of other traffic participants as well as the planning of an autonomous vehicle's motion.

The systems and methods of the present disclosure provide an improved approach for determining the intention of vehicles within the surrounding environment of a first vehicle based on various features extracted from sensor data. For instance, the first vehicle can obtain sensor data (e.g., camera image data) via its onboard cameras. The sensor data can depict one or more signal lights within the surrounding environment of the first vehicle. The first vehicle can pre-process the sensor data to generate one or more regions of interest that include the signal light(s). The systems and methods of the present disclosure can analyze (e.g., via one or more machine learned models) the one or more regions of interest to determine one or more spatial features (e.g., vehicle model, vehicle orientation, occluding objects, etc.) and one or more temporal features (e.g., states of the one or more signal lights over time, etc.) associated with each of the region(s) of interest. The spatial and temporal feature(s) can be feed into a machine learned object intention model, which can be trained to accurately determine object intention based on the spatial and temporal features associated with each of the one or more regions of interest. The determined object intention can be indicative of, for example, whether a proximate vehicle may intend to turn left, right, stop, etc. The first vehicle can utilize the determined object intention to improve its performance of various actions such as, for example, predicting the motion of proximate objects (e.g., vehicles, bicycles, etc.) or, if the first vehicle is an autonomous vehicle, planning vehicle motion according to the predicted motion of proximate objects.

In some implementations, a first vehicle can include an autonomous vehicle. An autonomous vehicle (e.g., ground-based vehicle, etc.) can include various systems and devices configured to control the operation of the vehicle. For example, an autonomous vehicle can include an onboard vehicle computing system (e.g., located on or within the autonomous vehicle) that is configured to operate the autonomous vehicle. The vehicle computing system can obtain sensor data from sensor(s) onboard the vehicle (e.g., cameras, LIDAR, RADAR, etc.), attempt to comprehend the vehicle's surrounding environment by performing various processing techniques on the sensor data, and generate an appropriate motion plan through the vehicle's surrounding environment. For example, the sensor data can be used in a processing pipeline that includes the detection of objects proximate to the autonomous vehicle (e.g., within the field of view of vehicle sensors), object motion prediction, and vehicle motion planning. For example, a motion plan can be determined by the vehicle computing system based on a determined object intention, and the vehicle can be controlled by a vehicle controller to initiate travel in accordance with the motion plan. The autonomous vehicle can also include one or more output devices such as, for example, one or more display screens (e.g., touch-sensitive interactive display screens), speakers, or other devices configured to provide informational prompts to a vehicle operator.

In some implementations, the first vehicle can include a non-autonomous vehicle. For instance, any vehicle may utilize the technology described herein for determining object intention. For example, a non-autonomous vehicle may utilize aspects of the present disclosure to determine the intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on a determined object intention.

To facilitate the determination of an object intention associated with an object of interest (e.g., a vehicle proximate to a first vehicle) an intention system can obtain sensor data. The sensor data can include any data associated with the surrounding environment of a first vehicle such as, for example, camera image data and/or Light Detection and Ranging (LIDAR) data. For example, in some implementations, the sensor data can include a sequence of image frames at each of a plurality of time steps. In such an implementation, the sequence of image frames can be captured in forward-facing video on one or more platforms of the first vehicle.

The sensor data can be associated with a surrounding environment of a first vehicle. Moreover, the sensor data can include one or more objects of interest within the surrounding environment of the first vehicle. The one or more objects of interest can include any moveable object within a threshold distance from the first vehicle. In some implementations, the threshold distance can include a predetermined distance. Additionally, or alternatively, the intention system can dynamically determine the threshold distance based on one or more factors such as weather, roadway conditions, environment, etc. For example, the one or more factors can indicate a potentially hazardous situation (e.g., heavy rain, construction, etc.). In such a case, the intention system can determine a larger threshold distance enhance roadway safety.

In some implementations, the one or more objects of interest can include one or more vehicles of interest. The one or more vehicles of interest can include, for example, any motorized object (e.g., motorcycles, automobiles, etc.). The one or more vehicles of interest (e.g., autonomous vehicles, non-autonomous vehicles, etc.) can be equipped with specific hardware to facilitate intent-related communication. For example, the one or more vehicles of interest can include one or more signal lights (e.g., turn signals, hazard lights, etc.) to signal the vehicle's intention. The vehicles intention, for example, can include future actions such as lane changes, parking, and/or one or more turns. For instance, a vehicle can signal its intention to stay in a parked position by simultaneously toggling two turn signals on/off in a blinking pattern (e.g., by turning on its hazard lights). In other scenarios, a vehicle can signal its intention to turn by toggling a turn signal on/off.

In some implementations, the intention system can analyze the sensor data to determine one or more regions of interest. For example, the intention system can process one or more image frames of the sensor data using one or more machine learning techniques. For instance, in some implementations, the intention system can apply a spatial mask and a fully convolutional network to extract the one or more regions of interest from the sensor data.

The one or more regions of interest can include one or more cropped image frames associated with an object of interest. For instance, each region of interest can include at least one vehicle of interest. More particularly, the one or more cropped image frames can include an axis-aligned region of interest around each vehicle of interest. Moreover, in some implementations, each region of interest can include the signal light(s) associated with a vehicle of interest. In some implementations, each region of interest can include one or more states associated with the signal light(s). For instance, each of the signal light(s) can be illuminated or not depending on a time associated with the region of interest. In this manner, the region(s) of interest can include a streaming input of cropped image frames providing information associated with a vehicle of interest over time.

The intention system can determine one or more spatial features associated with at least one of the region(s) of interest. For example, in some implementations, the intention system can provide the one or more regions of interest as input to one or more machine learned models. For instance, at least one of the machine learned model(s) can include a convolutional neural network (e.g., a VGG16 based convolutional neural network) and/or another type of model. The machine learned model(s) can thereby extract one or more spatial features associated with the regions of interest.

In some implementations, the one or more spatial features can include a model representation of the vehicle of interest. For example, the model representation of the vehicle of interest can include one or more physical characteristics associated with the vehicle of interest. The one or more physical characteristics can include information associated with the vehicle of interest such as, for example, vehicle type, position, orientation, etc. For example, in some implementations, the model of the vehicle of interest can identify a vehicle orientation associated with the vehicle of interest. The vehicle orientation can be determined relative to another object within the surrounding environment of the first vehicle. For example, the vehicle orientation can be determined relative to one or more lane boundaries, a traffic light, a sign post such as a stop sign, a second vehicle within the first vehicles surrounding environment, etc. In some implementations, the vehicle orientation can be relative to the first vehicle. For example, the vehicle orientation can be based on the direction from which the vehicle of interest is viewed from the first vehicle. By way of example, the vehicle orientation can include designations such as behind, left, front, and/or right. In such an example, each designation can identify the direction from which the vehicle of interest is viewed from the first vehicle.

Additionally, or alternatively, the one or more spatial features can include one or more occluding objects. The one or more occluding objects can include any object within a region of interest other than the object of interest (e.g., vehicle of interest). For example, the one or more occluding objects can include one or more objects disrupting the view of a vehicle of interest. More particularly, the one or more occluding objects can include, for example, one or more objects disrupting the view of at least one signal light (e.g., one or more headlights, taillights, etc.) of the vehicle of interest. For instance, the occluding object(s) can be positioned between the vehicle of interest and one or more sensor(s) onboard the first vehicle. For example, the occluding object can be positioned in such a way (e.g., within the sensor's field of view) as to at least partially block the sensor(s) from capturing sensor data associated with the vehicle of interest (e.g., one or more turn signals of the vehicle of interest).

The intention system can determine one or more temporal features associated with at least one of the region(s) of interest. For example, in some implementations, the intention system can provide a data indicative of the region(s) of interest at multiple time steps as input to one or more machine learned models. For instance, at least one machine learned model can include a convolutional neural network (e.g., convolutional LSTM). The machine learned model can extract one or more temporal features associated with the regions of interest.

The one or more temporal features can include temporal characteristics of the region(s) of interest (e.g., a streaming input of image data). For example, the temporal feature(s) can include one or more semantic states associated with at least one signal light of a vehicle of interest over time. For instance, the one or more semantic states can include designations such as "off," "on," and "unknown." By way of example, "off" can indicate that a signal light did not illuminate over a time period; "on" can indicate that the signal light illuminated in some manner over a time period; and "unknown" can indicate the presence of an occluding object over a time period. In this manner, the temporal feature(s) can distinguish flashing lights and persistent lights from other specious light patterns.

The intention system can utilize a variety of machine learned model configurations to determine the one or more temporal features and the one or more spatial features. For example, in some implementations, the same machine learned model can be trained to determine the one or more temporal features and the one or more spatial features. Additionally, or alternatively, the temporal features can be determined separately from the one or more spatial features. For example, the temporal features and spatial features can be determined by different machine learned models. For instance, the temporal features can be determined via a first machine learned model (e.g., a convolutional LSTM), while the spatial features can be determined by a second machine learned model (e.g., a convolutional neural network).

Moreover, the temporal features and the spatial features can be determined concurrently and/or sequentially. For instance, the intention system can input the one or more regions of interest into two machine learned models to concurrently determine the one or more temporal features and the one or more spatial features. In some implementations, the intention system can determine the spatial feature(s) and the temporal feature(s) in a predetermined order. For example, the intention system can first input the one or more regions of interest into a machine learned model to determine the one or more spatial features and subsequently input the one or more regions of interest into the same or a different machine learned model to determine the one or more temporal features. In some implementations, the intention system can first determine the one or more temporal features and subsequently determine the one or more spatial features.

The intention system can determine an object intention associated with the object of interest. For instance, the intention system can determine object intention (e.g., vehicle intention) associated with a vehicle of interest. For example, the vehicle intention can indicate a predicted movement of the vehicle of interest such as a future left turn, right turn, emergency (e.g., flashers), and/or unknown. For example, in some implementations, the intention system can provide one or more temporal features and one or more spatial features to one or more machine learned models. The one or more machine learned models can include the same or different machine learned models that are used to determine the spatial feature(s) and/or temporal feature(s). In some implementations, at least one of these machine learned model(s) can include a fully connected neural network. In this instance, the features can be passed through the fully connected layer to produce one or more variables of interest such as vehicle intention.

In this manner, the object intention can be based, at least in part, on the spatial feature(s) and/or temporal feature(s). For example, the vehicle intention can be determined based, at least in part, on the one or more semantic states associated with at least one signal light of the vehicle of interest. For instance, a semantic state of "on" associated with a right turn signal and a semantic state of "off" associated with a left turn signal can indicate a right turn.

Moreover, in some implementations, the object intention can be determined based, at least in part, on the orientation of the object of interest. For instance, in the example scenario above regarding the right turn, the intention system can instead determine a left turn depending on the orientation of the vehicle. By way of example, the correct vehicle intention is a right turn when the vehicle of interest is being viewed from behind. Otherwise, for example if the vehicle of interest is being viewed from the front, the correct vehicle intention can be a left turn (e.g., the turn signal on the right side of the vehicle of interest identifies a left turn rather than a right turn). Thus, by accounting for the orientation of the object of interest, the intention system can improve the accuracy of object intention by determining a correct left turn rather than a right turn.

The intention system can initiate one or more actions based, at least in part, on the object intention. The one or more action(s) can include, for example, planning safe maneuvers, issuing one or more informational prompts, etc. For example, a bus (e.g., a vehicle of interest) can signal its intention to make a stop to pick up and drop off passengers by turning on one or more signal lights (e.g., emergency flashers). In such a case, the first vehicle can initiate one or more actions based on the bus's intention to stop. For example, in the event that the first vehicle is an autonomous vehicle, the intention system can provide data indicative of the bus's intention to stop to the vehicle's autonomy system (or sub-systems) such that the first vehicle can generate one or more motion plans to avoid the stopped bus (e.g., changing lanes, decelerating, etc.). Moreover, the first vehicle can initiate the identified motion plan (e.g., to safely avoid any interference with the bus). Additionally, or alternatively, the intention system can prompt an operator of the first vehicle. For instance, the first vehicle can issue a warning associated with the bus's intended stop and/or present a recommended maneuver to the operator of the first vehicle. In this manner, the intention system can reduce delays and congestions on the roadways by accounting for future actions of objects within the first vehicles surrounding environment, while also increasing the safety of the objects and first vehicle.

As another example, a truck (and/or the operator thereof) may intend to change lanes such that the truck will be in front of the first vehicle. Beforehand, the truck can signal its intention by activating one or more of the truck's signal lights (e.g., a right turn signal). In such a case, the intention system can determine the truck's intention and initiate one or more actions. For example, the intention system can identify one or more motion plans to avoid the truck (e.g., by decreasing its speed). Moreover, the intention system can issue a warning and/or present a recommended maneuver to the operator of the first vehicle. In some implementations, where the first vehicle is an autonomous vehicle, the first vehicle can plan and initiate the identified motion plan. In this manner, the intention system can further reduce delays and congestions on the road caused, for example, by various movements of the objects within the first vehicle's surroundings.

Although the above description provides examples that discuss vehicles of interest, the intention system is not limited to vehicles and can be applied to any object within the first vehicle's surrounding environment. For example, in some implementations, the intention system can be configured to determine the intention of one or more objects (e.g., bicycles) within the surrounding environment of the first vehicle. For example, the one or more regions of interest can include one or more bicycles of interest. More particularly, the regions of interest can include one or more signals associated with the object of interest (e.g., the bicycles of interest). Moreover, the intention system can be configured to determine one or more spatial features and one or more temporal features associated with a region of interest around the bicycle of interest (e.g., using machine learned model(s) that have been trained to analyze signals associated with a bicycle) Based on the spatial feature(s) and temporal feature(s), the intention system can determine a bicycle intention associated with the bicycle (e.g., using the trained model(s)) and initiate an action accordingly (e.g., output data for autonomous vehicle operation, provide data for display to an operator via a display device, etc.).

The systems and methods described herein provide a number of technical effects and benefits. For instance, the present disclosure allows a vehicle to more accurately predict object intention by using a series of improved models (e.g., neural network models, etc.) capable of leveraging sensor data (e.g., including temporal image sequences) to accurately decipher communications such as turn signals. Such an approach can allow for improved motion prediction of proximate objects and autonomous vehicle motion planning. Moreover, the systems and methods of the present disclosure provide a holistic vehicle intention formulation capable of estimating turn signals even when the visual evidence is small, and occlusions are frequent. The intention models of the present disclosure allow for accurate reasoning about object intention in situations where the signal(s) of an object are misleading. This provides for more accurate object intention predictions, for example, when the orientation of an object affects the intended meaning of a signal (e.g., the viewing direction of a vehicle effects the intended meaning of a turn signal). Such an approach can provide a more reliable, flexible, and scalable solution than models with handcrafted rules, especially in less ideal scenarios where heavy occlusion or the orientation of an object may otherwise affect the characterization of a signal. In this way, the present disclosure enhances the operation of a vehicle (e.g., autonomous vehicles, etc.) by improving the ability of the vehicle to determine the intention of other surrounding objects, while also improving the ability of an autonomous vehicle to plan and control its motion accordingly.

Example aspects of the present disclosure can provide an improvement to vehicle computing technology, such as autonomous vehicle computing technology. For instance, the systems and methods of the present disclosure allow vehicle technology to leverage sensor data acquired by a first vehicle to more accurately determine the intention of vehicles proximate to the first vehicle. For example, a computing system (e.g., vehicle computing system) can obtain sensor data associated with a surrounding environment of a first vehicle. The computing system can determine one or more regions of interest associated with the sensor data. For example, the sensor data can include a sequence of video frames from each of a plurality of time steps. The computing system can determine one or more spatial features (e.g., vehicle orientation) associated with at least one of the one or more regions of interest. The computing system can determine one or more temporal features (e.g., semantic states of signal lights) associated with at least one of the one or more regions of interest. The computing system can determine a vehicle intention associated with a vehicle of interest based, at least in part, on the one or more spatial features and the one or more temporal features. The computing system can initiate one or more actions based, at least in part, on the vehicle intention. Given the large intra-class variations with signal lights, frequent occlusions, and small visual evidence, hard coded premises of how turn signals should behave cannot account for the diversity of driving scenarios that are encountered every day. However, by leveraging a differentiable system that can be trained end-to-end using modern deep learning techniques, the systems and methods of the present disclosure can avoid the pitfalls of relying upon such hard-coded premises. Moreover, the systems and methods of the present disclosure can combine the strength of two distinct types of features (e.g., spatial and temporal) associated with sensor data to provide a significant improvement (e.g., 10-30% increase in accuracy) over other turn signal detection approaches. In this manner, the technology of the present disclosure achieves improved, accurate turn signal detection as a solution to a prevailing problem of accurate signal detection. Ultimately, the present disclosure utilizes specific machine learning techniques and holistic data to achieve numerous benefits (e.g., accurate vehicle intention predictions regardless of the orientation of a vehicle), that previous, inferior signal detection techniques fail to achieve.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

The vehicle 105 incorporating the vehicle computing system 100 can be various types of vehicles. The vehicle 105 can be an autonomous vehicle. For instance, the vehicle 105 can be a ground-based autonomous vehicle such as an autonomous car, autonomous truck, autonomous bus, scooter, bike, other form factors, etc. The vehicle 105 can be an air-based autonomous vehicle (e.g., airplane, helicopter, or other aircraft) or other types of vehicles (e.g., watercraft, etc.). The vehicle 105 can drive, navigate, operate, etc. with minimal and/or no interaction from a human operator 106 (e.g., driver). An operator 106 (also referred to as a vehicle operator) can be included in the vehicle 105 and/or remote from the vehicle 105. In some implementations, the vehicle 105 can be a non-autonomous vehicle.

In some implementations, the vehicle 105 can be configured to operate in a plurality of operating modes. The vehicle 105 can be configured to operate in a fully autonomous (e.g., self-driving) operating mode in which the vehicle 105 is controllable without user input (e.g., can drive and navigate with no input from a vehicle operator present in the vehicle 105 and/or remote from the vehicle 105). The vehicle 105 can operate in a semi-autonomous operating mode in which the vehicle 105 can operate with some input from a vehicle operator present in the vehicle 105 (and/or a human operator that is remote from the vehicle 105). The vehicle 105 can enter into a manual operating mode in which the vehicle 105 is fully controllable by a vehicle operator 106 (e.g., human driver, pilot, etc.) and can be prohibited and/or disabled (e.g., temporary, permanently, etc.) from performing autonomous navigation (e.g., autonomous driving). In some implementations, the vehicle 105 can implement vehicle operating assistance technology (e.g., collision mitigation system, power assist steering, etc.) while in the manual operating mode to help assist the vehicle operator of the vehicle 105. For example, a collision mitigation system can utilize a predicted intention of objects within the vehicle's 105 surrounding environment to assist an operator 106 in avoiding collisions and/or delays even when in manual mode.

The operating modes of the vehicle 105 can be stored in a memory onboard the vehicle 105. For example, the operating modes can be defined by an operating mode data structure (e.g., rule, list, table, etc.) that indicates one or more operating parameters for the vehicle 105, while in the particular operating mode. For example, an operating mode data structure can indicate that the vehicle 105 is to autonomously plan its motion when in the fully autonomous operating mode. The vehicle computing system 100 can access the memory when implementing an operating mode.

The operating mode of the vehicle 105 can be adjusted in a variety of manners. For example, the operating mode of the vehicle 105 can be selected remotely, off-board the vehicle 105. For example, a remote computing system (e.g., of a vehicle provider and/or service entity associated with the vehicle 105) can communicate data to the vehicle 105 instructing the vehicle 105 to enter into, exit from, maintain, etc. an operating mode. For example, in some implementations, the remote computing system can be an operations computing system 195, as disclosed herein. By way of example, such data communicated to a vehicle 105 by the operations computing system 195 can instruct the vehicle 105 to enter into the fully autonomous operating mode. In some implementations, the operating mode of the vehicle 105 can be set onboard and/or near the vehicle 105. For example, the vehicle computing system 100 can automatically determine when and where the vehicle 105 is to enter, change, maintain, etc. a particular operating mode (e.g., without user input). Additionally, or alternatively, the operating mode of the vehicle 105 can be manually selected via one or more interfaces located onboard the vehicle 105 (e.g., key switch, button, etc.) and/or associated with a computing device proximate to the vehicle 105 (e.g., a tablet operated by authorized personnel located near the vehicle 105). In some implementations, the operating mode of the vehicle 105 can be adjusted by manipulating a series of interfaces in a particular order to cause the vehicle 105 to enter into a particular operating mode.

The vehicle computing system 100 can include one or more computing devices located onboard the vehicle 105. For example, the computing device(s) can be located on and/or within the vehicle 105. The computing device(s) can include various components for performing various operations and functions. For instance, the computing device(s) can include one or more processors and one or more tangible, non-transitory, computer readable media (e.g., memory devices, etc.). The one or more tangible, non-transitory, computer readable media can store instructions that when executed by the one or more processors cause the vehicle 105 (e.g., its computing system, one or more processors, etc.) to perform operations and functions, such as those described herein for determining object intentions based on physical attributes.

The vehicle 105 can include a communications system 120 configured to allow the vehicle computing system 100 (and its computing device(s)) to communicate with other computing devices. The vehicle computing system 100 can use the communications system 120 to communicate with one or more computing device(s) that are remote from the vehicle 105 over one or more networks (e.g., via one or more wireless signal connections). In some implementations, the communications system 120 can allow communication among one or more of the system(s) on-board the vehicle 105. The communications system 120 can include any suitable components for interfacing with one or more network(s), including, for example, transmitters, receivers, ports, controllers, antennas, and/or other suitable components that can help facilitate communication.

As shown in FIG. 1, the vehicle 105 can include one or more vehicle sensors 125, an autonomy computing system 130, one or more vehicle control systems 135, and other systems, as described herein. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can send and/or receive data, messages, signals, etc. amongst one another via the communication channel.

The vehicle sensor(s) 125 can be configured to acquire sensor data 140. This can include sensor data associated with the surrounding environment of the vehicle 105. For instance, the sensor data 140 can acquire image and/or other data within a field of view of one or more of the vehicle sensor(s) 125. The vehicle sensor(s) 125 can include a Light Detection and Ranging (LIDAR) system, a Radio Detection and Ranging (RADAR) system, one or more cameras (e.g., visible spectrum cameras, infrared cameras, etc.), motion sensors, and/or other types of imaging capture devices and/or sensors. The sensor data 140 can include image data, radar data, LIDAR data, and/or other data acquired by the vehicle sensor(s) 125. The vehicle 105 can also include other sensors configured to acquire data associated with the vehicle 105. For example, the vehicle 105 can include inertial measurement unit(s), wheel odometry devices, and/or other sensors.

In some implementations, the sensor data 140 can be indicative of one or more objects within the surrounding environment of the vehicle 105. The object(s) can include, for example, vehicles, pedestrians, bicycles, and/or other objects. The object(s) can be located in front of, to the rear of, to the side of the vehicle 105, etc. The sensor data 140 can be indicative of locations associated with the object(s) within the surrounding environment of the vehicle 105 at one or more times. The vehicle sensor(s) 125 can provide the sensor data 140 to the autonomy computing system 130.

In addition to the sensor data 140, the autonomy computing system 130 can retrieve or otherwise obtain map data 145. The map data 145 can provide information about the surrounding environment of the vehicle 105. In some implementations, the vehicle 105 can obtain detailed map data that provides information regarding: the identity and location of different roadways, road segments, buildings, or other items or objects (e.g., lampposts, crosswalks, curbing, etc.); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); the location of obstructions (e.g., roadwork, accidents, etc.); data indicative of events (e.g., scheduled concerts, parades, etc.); and/or any other map data that provides information that assists the vehicle 105 in comprehending and perceiving its surrounding environment and its relationship thereto. In some implementations, the vehicle computing system 100 can determine a vehicle route for the vehicle 105 based at least in part on the map data 145.

The vehicle 105 can include a positioning system 150. The positioning system 150 can determine a current position of the vehicle 105. The positioning system 150 can be any device or circuitry for analyzing the position of the vehicle 105. For example, the positioning system 150 can determine position by using one or more of inertial sensors (e.g., inertial measurement unit(s), etc.), a satellite positioning system, based on IP address, by using triangulation and/or proximity to network access points or other network components (e.g., cellular towers, WiFi access points, etc.) and/or other suitable techniques. The position of the vehicle 105 can be used by various systems of the vehicle computing system 100 and/or provided to a remote computing system.

For example, the map data 145 can provide the vehicle 105 relative positions of the elements of a surrounding environment of the vehicle 105. The vehicle 105 can identify its position within the surrounding environment (e.g., across six axes, etc.) based at least in part on the map data 145. For example, the vehicle computing system 100 can process the sensor data 140 (e.g., LIDAR data, camera data, etc.) to match it to a map of the surrounding environment to get an understanding of the vehicle's position within that environment.

The autonomy computing system 130 can include a perception system 155, a prediction system 160, a motion planning system 165, and/or other systems that cooperate to perceive the surrounding environment of the vehicle 105 and determine a motion plan for controlling the motion of the vehicle 105 accordingly. For example, the autonomy computing system 130 can obtain the sensor data 140 from the vehicle sensor(s) 125, process the sensor data 140 (and/or other data) to perceive its surrounding environment, predict the motion of objects within the surrounding environment, and generate an appropriate motion plan through such surrounding environment. The autonomy computing system 130 can communicate with the one or more vehicle control systems 135 to operate the vehicle 105 according to the motion plan.

The vehicle computing system 100 (e.g., the autonomy computing system 130) can identify one or more objects that are proximate to the vehicle 105 based at least in part on the sensor data 140 and/or the map data 145. For example, the vehicle computing system 100 (e.g., the perception system 155) can process the sensor data 140, the map data 145, etc. to obtain perception data 170. The vehicle computing system 100 can generate perception data 170 that is indicative of one or more states (e.g., current and/or past state(s)) of a plurality of objects that are within a surrounding environment of the vehicle 105. For example, the perception data 170 for each object can describe (e.g., for a given time, time period) an estimate of the object's: current and/or past location (also referred to as position); current and/or past speed/velocity; current and/or past acceleration; current and/or past heading; current and/or past orientation; size/footprint (e.g., as represented by a bounding shape); class (e.g., pedestrian class vs. vehicle class vs. bicycle class), the uncertainties associated therewith, and/or other state information. The perception system 155 can provide the perception data 170 to the prediction system 160, the motion planning system 165, the intention system 185, and/or other system(s).

The prediction system 160 can be configured to predict a motion of the object(s) within the surrounding environment of the vehicle 105. For instance, the prediction system 160 can generate prediction data 175 associated with such object(s). The prediction data 175 can be indicative of one or more predicted future locations of each respective object. For example, the prediction system 160 can determine a predicted motion trajectory along which a respective object is predicted to travel over time. A predicted motion trajectory can be indicative of a path that the object is predicted to traverse and an associated timing with which the object is predicted to travel along the path. The predicted path can include and/or be made up of a plurality of way points. In some implementations, the prediction data 175 can be indicative of the speed and/or acceleration at which the respective object is predicted to travel along its associated predicted motion trajectory. In some implementations, the prediction data 175 can include a predicted object intention (e.g., a right turn) based on physical attributes of the object.

The prediction system 160 can output the prediction data 175 (e.g., indicative of one or more of the predicted motion trajectories) to the motion planning system 165.

The vehicle computing system 100 (e.g., the motion planning system 165) can determine a motion plan 180 for the vehicle 105 based at least in part on the perception data 170, the prediction data 175, and/or other data. A motion plan 180 can include vehicle actions (e.g., planned vehicle trajectories, speed(s), acceleration(s), intention, other actions, etc.) with respect to one or more of the objects within the surrounding environment of the vehicle 105 as well as the objects' predicted movements. For instance, the motion planning system 165 can implement an optimization algorithm, model, etc. that considers cost data associated with a vehicle action as well as other objective functions (e.g., cost functions based on speed limits, traffic lights, etc.), if any, to determine optimized variables that make up the motion plan 180. The motion planning system 165 can determine that the vehicle 105 can perform a certain action (e.g., pass an object, etc.) without increasing the potential risk to the vehicle 105 and/or violating any traffic laws (e.g., speed limits, lane boundaries, signage, etc.). For instance, the motion planning system 165 can evaluate one or more of the predicted motion trajectories of one or more objects during its cost data analysis as it determines an optimized vehicle trajectory through the surrounding environment. The motion planning system 165 can generate cost data associated with such trajectories. In some implementations, one or more of the predicted motion trajectories may not ultimately change the motion of the vehicle 105 (e.g., due to an overriding factor). In some implementations, the motion plan 180 may define the vehicle's motion such that the vehicle 105 avoids the object(s), reduces speed to give more leeway to one or more of the object(s), proceeds cautiously, performs a stopping action, etc.

The motion planning system 165 can be configured to continuously update the vehicle's motion plan 180 and a corresponding planned vehicle motion trajectory. For example, in some implementations, the motion planning system 165 can generate new motion plan(s) for the vehicle 105 (e.g., multiple times per second). Each new motion plan can describe a motion of the vehicle 105 over the next planning period (e.g., next several seconds). Moreover, a new motion plan may include a new planned vehicle motion trajectory. Thus, in some implementations, the motion planning system 165 can continuously operate to revise or otherwise generate a short-term motion plan based on the currently available data. Once the optimization planner has identified the optimal motion plan (or some other iterative break occurs), the optimal motion plan (and the planned motion trajectory) can be selected and executed by the vehicle 105.

The vehicle computing system 100 can cause the vehicle 105 to initiate a motion control in accordance with at least a portion of the motion plan 180. A motion control can be an operation, action, etc. that is associated with controlling the motion of the vehicle. For instance, the motion plan 180 can be provided to the vehicle control system(s) 135 of the vehicle 105. The vehicle control system(s) 135 can be associated with a vehicle controller (e.g., including a vehicle interface) that is configured to implement the motion plan 180. The vehicle controller can, for example, translate the motion plan into instructions for the appropriate vehicle control component (e.g., acceleration control, brake control, steering control, etc.). By way of example, the vehicle controller can translate a determined motion plan 180 into instructions to adjust the steering of the vehicle 105 "X"

degrees, apply a certain magnitude of braking force, etc. The vehicle controller (e.g., the vehicle interface) can help facilitate the responsible vehicle control (e.g., braking control system, steering control system, acceleration control system, etc.) to execute the instructions and implement the motion plan 180 (e.g., by sending control signal(s), making the translated plan available, etc.). This can allow the vehicle 105 to autonomously travel within the vehicle's surrounding environment.

As shown in FIG. 1, the vehicle 105 can include an HMI ("Human Machine Interface") 190 that can output data and accept input from the operator 106 of the vehicle 105. For instance, the HMI 190 can include one or more output devices (e.g., speakers, display devices, tactile devices, etc.) such that, in some implementations, the HMI 190 can provide one or more informational prompts to the operator 106 of the vehicle 105. For example, the HMI 190 can be configured to provide prediction data 170 such as a predicted object intention to one or more vehicle operator(s) 106. Additionally, or alternatively, the HMI 190 can include one or more input devices (e.g., buttons, microphones, cameras, etc.) to accept vehicle operator 106 input. In this manner, the HMI 190 can communicate with the vehicle operator 106.

The vehicle computing system 100 can include an intention system 185. As illustrated in FIG. 1 the intention system 185 can be implemented onboard the vehicle 105 (e.g., as a portion of the vehicle computing system 100). Moreover, in some implementations, the intention system 185 can be remote from the vehicle 105 (e.g., as a portion of an operations computing system 195). The intention system 185 can determine one or more object intention(s) associated with objects within the surrounding environment of the vehicle 105, as described in greater detail herein. In some implementations, the intention system 185 can be configured to operate in conjunction with the vehicle autonomy system 130. For example, the intention system 185 can send data to and receive data from the vehicle autonomy system 130. In some implementations, the intention system 185 can be included in or otherwise a part of a vehicle autonomy system 130. The intention system 185 can include software and hardware configured to provide the functionality described herein. In some implementations, the intention system 185 can be implemented as a subsystem of a vehicle computing system 100. Additionally, or alternatively, the intention system 185 can be implemented via one or more computing devices that are remote from the vehicle 105. Example intention system 185 configurations according to example aspects of the present disclosure are discussed in greater detail with respect to FIGS. 2-6.

The operator 106 can be associated with the vehicle 105 to take manual control of the vehicle, if necessary. For instance, in a testing scenario, a vehicle 105 can be periodically tested with controlled faults that can be injected into an autonomous vehicle's autonomy system 130. This can help the vehicle's response to certain scenarios. A vehicle operator 106 can be located within the vehicle 105 and/or remote from the vehicle 105 to take control of the vehicle 105 (e.g., in the event the fault results in the vehicle exiting from a fully autonomous mode in the testing environment).

Although many examples are described herein with respect to autonomous vehicles, the disclosed technology is not limited to autonomous vehicles. For instance, any vehicle may utilize the technology described herein for determining object intention. For example, a non-autonomous vehicle may utilize aspects of the present disclosure to determine the intention of one or more objects (e.g., vehicles, bicycles, etc.) proximate to a non-autonomous vehicle. Such information may be utilized by a non-autonomous vehicle, for example, to provide informational notifications to an operator of the non-autonomous vehicle. For instance, the non-autonomous vehicle can notify or otherwise warn the operator of the non-autonomous vehicle based on a determined object intention.

Figure 2:
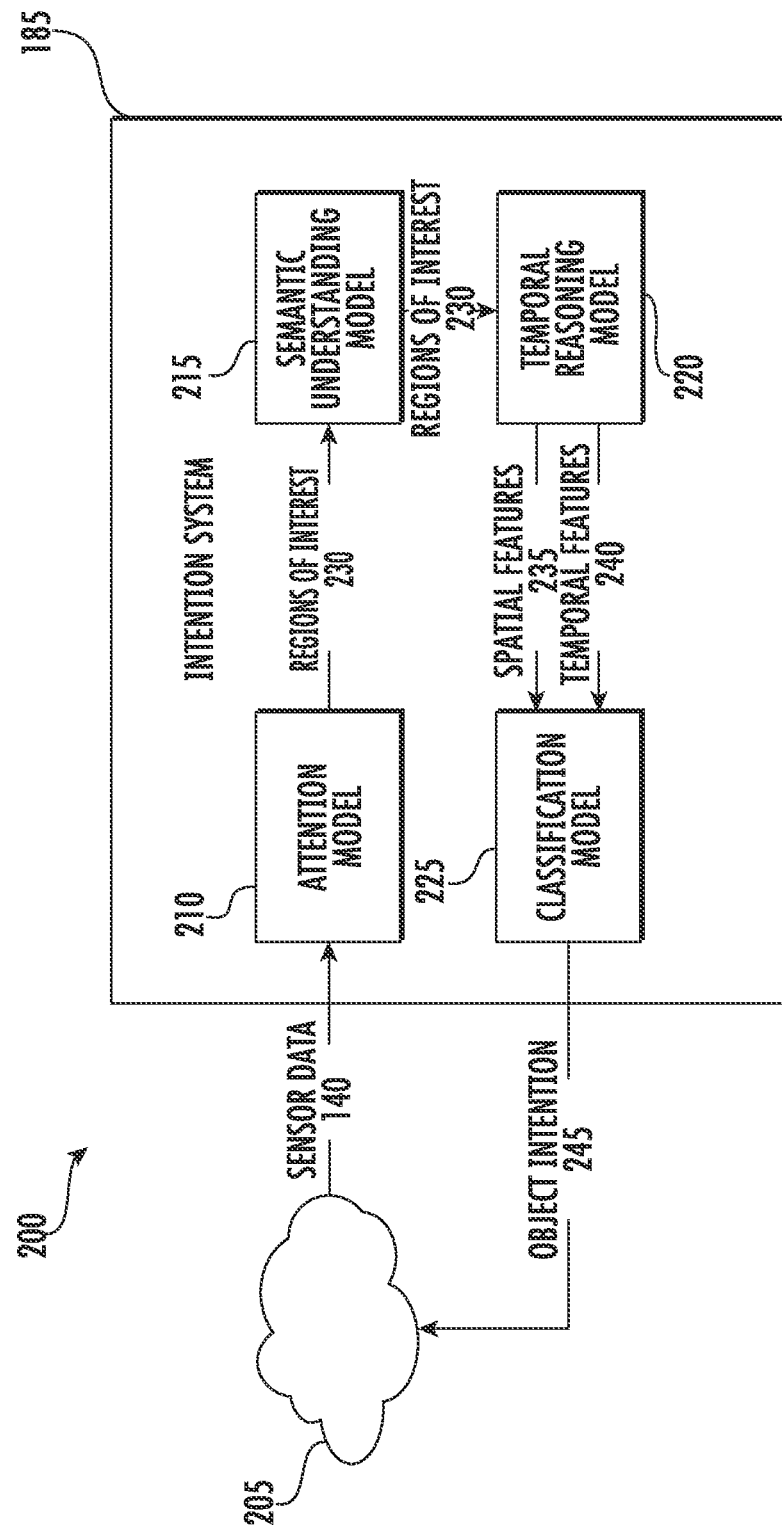
FIG. 2 depicts an example data flow diagram of an example intention system according to example implementations of the present disclosure.

FIG. 2 depicts an example data flow diagram 200 of an example intention system 185 according to example implementations of the present disclosure. To facilitate the determination of an object intention associated with an object of interest (e.g., a vehicle proximate to a first vehicle) the intention system 185 can obtain sensor data 140 via network 205. As described above with reference to FIG. 1, sensor data 140 can include any data associated with the surrounding environment of the vehicle 105 such as, for example, camera image data and/or Light Detection and Ranging (LIDAR) data. For example, in some implementations, the sensor data 140 can include a sequence of image frames at each of a plurality of time steps. For example, the sequence of image frames can be captured in forward-facing video on one or more platforms of vehicle 105.

In some implementations, the sensor data 140 can be captured via the one or sensor(s) 125 and transmitted to the intention system 185 via network 205. For example, the sensor(s) 125 can be communicatively connected to the intention system 185. In some implementations, the sensor data 140 can be captured by one or more remote computing devices (e.g., operation computing system 195) located remotely from the vehicle computing system 100. For example, the intention system 185 can be communicatively connected to one or more sensors associated with another vehicle and/or the operations computing system 195. In such a case, the intention system 185 can obtain the sensor data 140, via network 205, from the one or more remote computing devices and/or operations computing system 195.

The sensor data 140 can be associated with a surrounding environment of the vehicle 105. More particularly, the sensor data 140 can include one or more objects of interest within the surrounding environment of the vehicle 105. The one or more object(s) of interest can include any moveable object within a threshold distance from the vehicle 105. In some implementations, the threshold distance can include a predetermined distance (e.g., the detection range of sensor(s) 125). Additionally, or alternatively, the intention system 185 can dynamically determine the threshold distance based on one or more factors such as weather, roadway conditions, environment, etc. For example, the one or more factor(s) can indicate a potentially hazardous situation (e.g., heavy rain, construction, etc.). In such a case, the intention system 185 can determine a larger threshold distance to increase safety.

In some implementations, the one or more object(s) of interest can include one or more vehicle(s) of interest. The vehicle(s) of interest can include, for example, any motorized object (e.g., motorcycles, automobiles, etc.). The vehicle(s) of interest (e.g., autonomous vehicles, non-autonomous vehicles, etc.) can be equipped with specific hardware to facilitate intent-related communication. For example, the one or more vehicle(s) of interest can include one or more signal light(s) (e.g., turn signals, hazard lights, etc.) to signal the vehicle's intention. The vehicle intention, for example, can include future actions such as lane changes, parking, one or more turns, and/or other actions. For instance, a vehicle can signal its intention to stay in a parked position by simultaneously toggling two turn signals on/off in a blinking pattern (e.g., by turning on its hazard lights). In other scenarios, a vehicle can signal its intention to turn by toggling a single turn signal on/off.

The intention system 185 can include an attention model 210 configured to identify the signals of an object. For example, attention model 210 can obtain the sensor data 140. And, in some implementations, the attention model 210 can analyze the sensor data 140 to determine one or more region(s) of interest 230. For instance, the attention model 210 can process one or more image frame(s) of the sensor data 140 using one or more machine learning techniques.

By way of example, in some implementations, the attention model 210, can process one or more input frames (e.g., image frames) by applying a spatial mask. For instance, the attention model 210 can resize the image frames to a fixed 224×224 pixels. A 4-layer, fully convolutional network can be utilized to compute a pixel-wise, scalar attention value. For example, Kernels can be 3×3 with dilations (1, 2, 2, 1) and channel dimensions (32, 64, 64, 1). The resulting scalar mask can be point-wise multiplied with the original, resized input frames (e.g., image frames). This implementation can be beneficial, for example, as it allows a network to add more saliency to relevant pixels and attenuate noisy spatial artifacts. In this manner, the attention model 210 can apply a spatial mask to extract the one or more region(s) of interest 230 from the sensor data 140.

Figure 3:
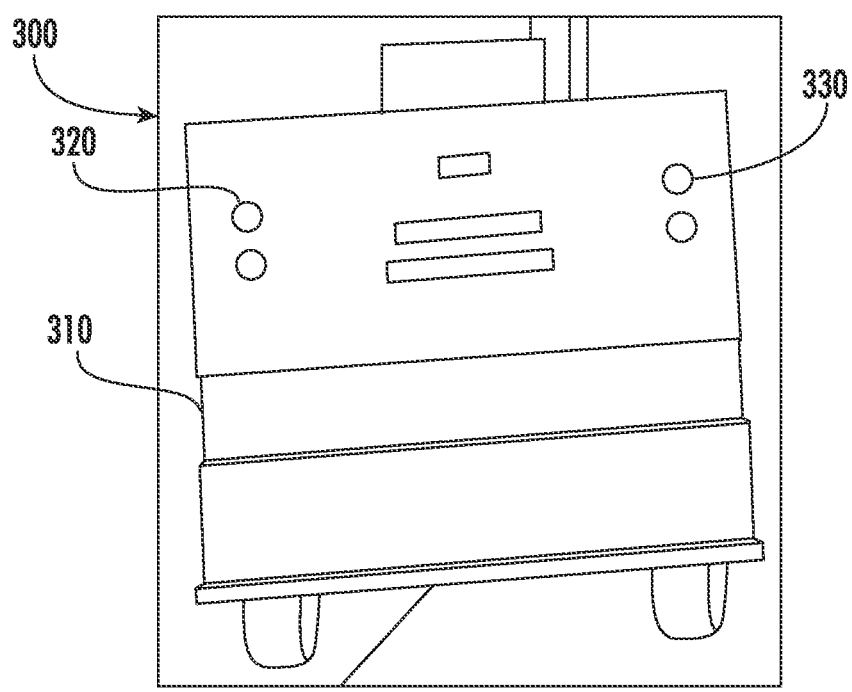
FIG. 3 depicts an example region of interest according to example implementations of the present disclosure.

The one or more region(s) of interest 230 can include one or more cropped image frame(s) associated with an object of interest. By way of example, FIG. 3 depicts an example region of interest 300 according to example implementations of the present disclosure. The region of interest 300 can include an image frame (e.g., captured via one or more sensor(s) 125) associated with the surrounding environment of the vehicle 105. The region of interest 300 can include at least one object of interest 310. For example, the region of interest 300 can include a cropped image frame of an axis-aligned region of interest 300 around the object of interest 310. Moreover, in some implementations, the region of interest 300 can include at least one vehicle of interest. In such a case, the region of interest 300 can include a cropped image frame of an axis-aligned region of interest 300 around the vehicle of interest.

In addition, the region of interest 300 can include one or more signals (e.g., 320/330) associated with the object of interest 310. By way of example, where the region of interest 300 includes the vehicle of interest, the region of interest 300 can include signal lights 320 and/or 330 associated with the vehicle of interest. In some implementations, the region of interest 300 can include one or more states associated with the one or more signal(s) 320 and/or 330. For instance, signal light(s) 320/330 associated with the vehicle of interest can be illuminated or not depending on a time associated with the region of interest 300. Additionally, or alternatively, the region of interest 300 can include other signal(s) such as hand movements associated with the object of interest 310. Moreover, the region of interest 300 can include one or more state(s) associated with the other signals (e.g., different movement patterns, etc.). In this manner, the region of interest 300 can include one cropped image frame of a streaming input of cropped image frames providing information associated with the object of interest 310 (e.g., vehicle of interest) over time.

Turning back to FIG. 2, the intention system 185 can include a semantic understanding model 215 configured to determine one or more spatial feature(s) 235 associated with the region(s) of interest 230. For example, the semantic understanding model 215 can be configured to identify occlusion and the direction from which an object is being viewed. In some implementations, the semantic understanding model 215 can provide the one or more region(s) of interest 230 as input to one or more machine learned model(s) configured to determine the one or more spatial feature(s) 235. For instance, at least one of the machine learned model(s) utilized by the intention system 185 (e.g., the semantic understanding model 215) can include a convolutional neural network (e.g., a VGG16 based convolutional neural network) and/or another type of model.

By way of example, in some implementations, a deep convolutional network can be used to recover spatial concept(s). Spatial feature(s) 235, for example, can be extracted using a VGG16 based convolutional neural network architecture. In such a case, weights can be pre-trained on a software application, such as ImageNet, and fine-tuned during training. The machine learned model (e.g., semantic understanding model 215) can thereby extract one or more spatial feature(s) 235 associated with the region(s) of interest 230. For example, this can allow the semantic understanding model 215 to model at least one of an object of interest 310, the orientation of the object of interest 310, occluding objects, and/or other spatial concepts. Moreover, in some implementations, the machine learned model can produce a 7×7×512 output that can retain a coarse spatial dimension for temporal processing by a convolutional LSTM.

As discussed above, the one or more spatial feature(s) 235 can include a model representation of the object of interest 310. For example, the model representation can include a model representation of the vehicle of interest. The model representation of the object of interest 310 can include one or more physical characteristics associated with the object of interest 310. By way of example, where the object of interest 310 is the vehicle of interest, the physical characteristic(s) can include information associated with the vehicle of interest such as, for example, vehicle type, position, orientation, etc. The model representation can be two-dimensional, three-dimensional, etc.

For example, in some implementations, the model representation of the object of interest 310 can identify an object orientation associated with the object of interest 310. For example, the object orientation can include a vehicle orientation associated with the vehicle of interest. The object orientation (e.g., vehicle orientation) can be determined relative to another object within the surrounding environment of the vehicle 105. For example, the object orientation (e.g., vehicle orientation) can be determined relative to one or more lane boundaries, a traffic light, a sign post such as a stop sign, another vehicle within the surrounding environment of vehicle 105, etc. In some implementations, the object orientation (e.g., vehicle orientation) can be relative to the vehicle 105. For example, the object orientation (e.g., vehicle orientation) can be based on the direction from which the object of interest 310 (e.g., vehicle of interest) is viewed from the vehicle 105. By way of example, the object orientation (e.g., vehicle orientation) can include designations such as behind, left, front, and/or right. In such an example, each designation can identify the direction from which the object of interest 310 (e.g., vehicle of interest) is viewed from the vehicle 105.

Additionally, or alternatively, the one or more spatial feature(s) 235 can include one or more occluding objects. The one or more occluding objects can include any object within the region(s) of interest 230 other than the object of interest 310 (e.g., vehicle of interest). For example, the one or more occluding objects can include one or more objects disrupting the view of the object of interest 310 (e.g., vehicle of interest). More particularly, the one or more occluding objects can include, for example, one or more objects disrupting the view of at least one signal associated with the object of interest 310. For example, where the region(s) of interest 230 include the vehicle of interest, the occluding object(s) can include object(s) disrupting the view of at least one signal light 320 and/or 330 (e.g., one or more headlights, taillights, etc.) of the vehicle of interest. For instance, the occluding object(s) can be positioned between the object of interest 310 and one or more sensor(s) (e.g., sensor(s) 125) onboard the vehicle 105. For example, the occluding object can be positioned in such a way (e.g., within the sensor's field of view) as to at least partially block the sensor(s) (e.g., sensor(s) 125) from capturing sensor data 140 associated with the object of interest 310 (e.g., one or more turn signal(s) 320/330 of the vehicle of interest).

The intention system 185 can include a temporal reasoning model 220 configured to determine one or more temporal feature(s) 240 associated with at least one of the region(s) of interest 230. For example, in some implementations, the temporal reasoning model 220 can provide data indicative of a sequence regions of interest 230 at multiple time steps as input to one or more machine learned models. For instance, at least one machine learned model (e.g., the temporal reasoning model 220) can include a convolutional neural network (e.g., convolutional LSTM). The machine learned model can extract one or more temporal feature(s) 240 associated with the region(s) of interest 230.

By way of example, the temporal reasoning model 220 can input per-frame information (e.g., region(s) of interest 230, spatial feature(s) 235, etc.) to a convolutional LSTM to distinguish the temporal patterns of one or more signal(s) (e.g., turn signal(s), emergency flashers, etc.) from other content. For example, in some implementations, a convolutional LSTM (ConvLSTM) model can be used to refine the spatial feature(s) 235 associated with a sequence of region(s) of interest 230 by modeling temporal feature(s) 240 of a streaming input of region(s) of interest 230 (e.g., stream of feature tensors). For example, the Convolutional LSTM can learn temporal feature(s) 240 by maintaining an internal, hidden state, which can be modified through a series of control gates.

The equation below illustrates an example algorithm for determining temporal feature(s) 240. For example, let $X_t$ be a feature tensor (e.g., associated with region(s) of interest 230) that is input at time t, and W and B be the learned weights and biases of the ConvLSTM. The hidden state can be embodied by two tensors, H and C, which are updated over time by the following expressions:

$$I_t = \sigma(W^{xi}*\tilde{X}_t + W^{hi}*H_{t-1} + W^{ci}*C_{t-1} + B^i) \quad (1)$$

$$F_t = \sigma(W^{xf}*X_t + W^{hf}*H_{t-1} + W^{cf}*C_{t-1} + B^f) \quad (2)$$

$$C_t = F_t \circ C_{t-1} + I_t \circ \tanh(W^{xc}*X_t + W^{hc}*H_{t-1} + B^c) \quad (3)$$

$$O_t = \sigma(W^{xo}*X_t + W^{ho}*H_{t-1} + W^{co}*C_t + B^o) \quad (4)$$

$$H_t = O_t \circ \tanh(C_t). \quad (5)$$

The parameterized gates I (input), F (forget) and O (output) can control the flow of information through the network and how much of it should be propagated in time. Temporal feature(s) 240 can be maintained through cell memory, which can accumulate relevant latent representations. For example, Equation 3 can prevent overfitting by applying dropout on the output as a regularizer. At Equation 1, the input gate can control the use of new information from the input. At Equation 2, the forget gate can control what information is discarded from the previous a cell state. And, at Equation 3, the output gate can further control the propagation of information from a current cell state to the output, for instance, by element-wise multiplication at Equation 5.

In some implementations, the ConvLSTM module can be constructed as a series of ConvLSTM layers, each following Equations (1)-(5). For example, in a multi-layer architecture, each subsequent layer can take as input the hidden state, $H_t$, from the preceding layer (the first layer takes $X_t$ as input). By way of example, in some implementations, two ConvLSTM layers, each with a 7×7×256 hidden state can be utilized. Additionally, or alternatively, a variety of ConvLSTM layers can be utilized to determine temporal feature(s) 240 associated with a series of region(s) of interest 230.

The temporal feature(s) 240 can include temporal characteristics of the region(s) of interest 230 (e.g., a streaming input of image data). For example, the temporal feature(s) 240 can include one or more semantic state(s) associated with a signal of the object of interest 310. For example, the temporal feature(s) 240 can include one or more semantic state(s) associated with at least one signal light (e.g., 320 and/or 330) of the vehicle of interest over time. For instance, the one or more semantic states can include designations such as "off," "on," and/or "unknown." By way of example, "off" can indicate that a signal is not active in a given series of region(s) of interest 230. For instance, "off" can indicate that a signal light (e.g., 320) associated with a vehicle of interest (e.g., 310) is not illuminated over a time period. The designation "on" can indicate an active signal over a period of time. For instance, "on" can indicate that a signal light (e.g., 330) associated with a vehicle of interest (e.g., 310) illuminated in some manner over a time period. The designation "unknown" can indicate the presence of an occluding object over a time period. For instance, "unknown" can indicate that an occluding object disrupted the view of a signal light (e.g., 330) over a time period. In this manner, the temporal feature(s) 240 can distinguish flashing lights and persistent lights from other specious light patterns.

The intention system 185 can include a classification model 225 configured to classify the resulting spatial and temporal feature(s) 235/240. For example, in some implementations, the classification model 225 can provide one or more temporal feature(s) 240 and one or more spatial feature(s) 235 to one or more machine learned model(s) configured to determine object intention 245. The machine learned model(s) can include the same or different machine learned model(s) that are used to determine the spatial feature(s) 235 and/or temporal feature(s) 240. By way of example, in some implementations, at least one of the machine learned model(s) can include a neural network. For instance, the feature(s) 235/240 can be passed through a fully connected neural network to produce one or more variables of interest such as $y_t$(intent) over semantic states such as "left turn," "right turn," "flashers," "off," and "unknown;" $y_t$(left) and $y_t$(right) over the states "on," "off," "unknown," (e.g., for individual lights on the left and right sides of the vehicle, respectively); $y_t$(view) over the states "behind," "left," "right," and "front." In some implementations, the parameters on each of these layers can be regularized with weight decay to prevent overfitting.

The classification model 225 can be configured to determine object intention 245 associated with the object of interest 310. For instance, in some implementations, the classification model 225 can determine a vehicle intention associated with the vehicle of interest. For example, the vehicle intention can indicate a predicted movement of the vehicle of interest such as a future left turn, right turn, emergency stop (e.g., flashers), and/or unknown.

The object intention 245 (e.g., vehicle intention) can be based, at least in part, on the spatial feature(s) 235 and/or temporal feature(s) 240. For example, the object intention 245 (e.g., vehicle intention) can be determined based, at least in part, on the one or more semantic state(s) associated with at least one signal of the object of interest 310. For instance, a vehicle intention can be determined based, at least in part, on the semantic state(s) associated with at least one signal light (e.g., 320/330) of the vehicle of interest. For instance, a semantic state of "on" associated with a right turn signal (e.g., 330) and a semantic state of "off" associated with a left turn signal (e.g., 320) can indicate a right turn.

Moreover, in some implementations, the object intention 245 can be determined based, at least in part, on the orientation of the object of interest 310 (e.g., vehicle of interest). For instance, in the example scenario above regarding the right turn, the intention system 185 (e.g., via the classification model 225) can instead determine a left turn depending on the orientation of the vehicle of interest. By way of example, the classification model 225 can determine a vehicle intention indicative of a right turn when the vehicle of interest is being viewed by the vehicle 105 from behind (e.g., vehicle orientation is indicative of "behind"). Otherwise, for example if the vehicle of interest is being viewed from the front (e.g., vehicle orientation is indicative of "front"), the classification model 225 can determine a vehicle intention indicative of a left turn (e.g., the turn signal on the right side of the vehicle of interest identifies a left turn rather than a right turn). Thus, by accounting for the orientation of the object of interest 310, the intention system 185 can improve the accuracy of object intentions 245 for a diverse set of real-world scenarios.

The intention system 185 can initiate one or more actions based, at least in part, on the object intention 245. The one or more actions can include, for example, planning safe maneuvers, issuing one or more informational prompts, etc. For example, the intention system 185 can communicate, via network 205, with the autonomy system 130 of an autonomous vehicle (e.g., the vehicle 105). For instance, the motion planning system 165 can generate a motion plan 180 based, at least in part, on the object intention 245.

By way of example, a bus (e.g., the vehicle of interest) can signal its intention to make a stop to pick up and drop off passengers by turning on one or more signal light(s) 320 and/or 330 (e.g., emergency flashers). In such a case, the intention system 185 can initiate one or more actions based on the vehicle intention to stop as indicated by the emergency flashers. For example, in the event that the vehicle 105 is an autonomous vehicle, the intention system 185 can provide data indicative of the vehicle intention to stop to the vehicle's autonomy system 130 (or sub-systems) such that the vehicle 105 can generate one or more motion plan(s) 180 to avoid the stopped bus (e.g., changing lanes, decelerating, etc.). Additionally, in some implementations, the intention system 185 can initiate the identified motion plan 180 (e.g., to safely avoid any interference with the bus).

As another example, a truck (and/or the operator thereof) may intend to change lanes such that the truck will be in front of the vehicle 105. Beforehand, the truck/truck operator can signal its intention by activating one or more of the truck's signal lights 320 and/or 330 (e.g., a right turn signal 320). In such a case, the intention system 185 can determine a vehicle intention to change lanes in front of the vehicle 105. The intention system 185 can communicate with the autonomy system 130 (or sub-system) such that the vehicle 105 can generate one or more motion plan(s) 180 to avoid the truck (e.g., by decreasing its speed, changing lane, etc.). In response, the intention system 185 can initiate one or more the motion plan(s) 180. For example, the intention system 185 can initiate one or more actions such as decelerating, changing a lane, etc.

Additionally, or alternatively, the intention system 185 can initiate a communication with one or more vehicle operator(s) 106. For example, the intention system 185 can communicate (e.g., via network 205) with one or more output device(s) (e.g., one or more output device(s) of the vehicle 105, an output device of a user device associated with the vehicle operator 106, HMI 190, etc.) to initiate one or more informational prompts. For example, the intention system 185 can initiate a prompt, via one or more output device(s) of vehicle 105, to the vehicle operator 106. For instance, the vehicle 105 can issue a warning associated with a bus's intention to stop and/or present a recommended maneuver to the vehicle operator 106. By way of example, the intention system 185 can initiate a warning of a sudden stop and suggest a maneuver to change lanes. In this manner, the intention system 185 can reduce delays and congestions on the roadways, while also increasing the safety of object(s) of interest and the vehicles, by providing relevant information to vehicle operators (e.g., such as vehicle operator 106) and accounting for future actions of objects within the surrounding environment of the vehicle 105 when determining motion plan(s) 180.

Figure 4:
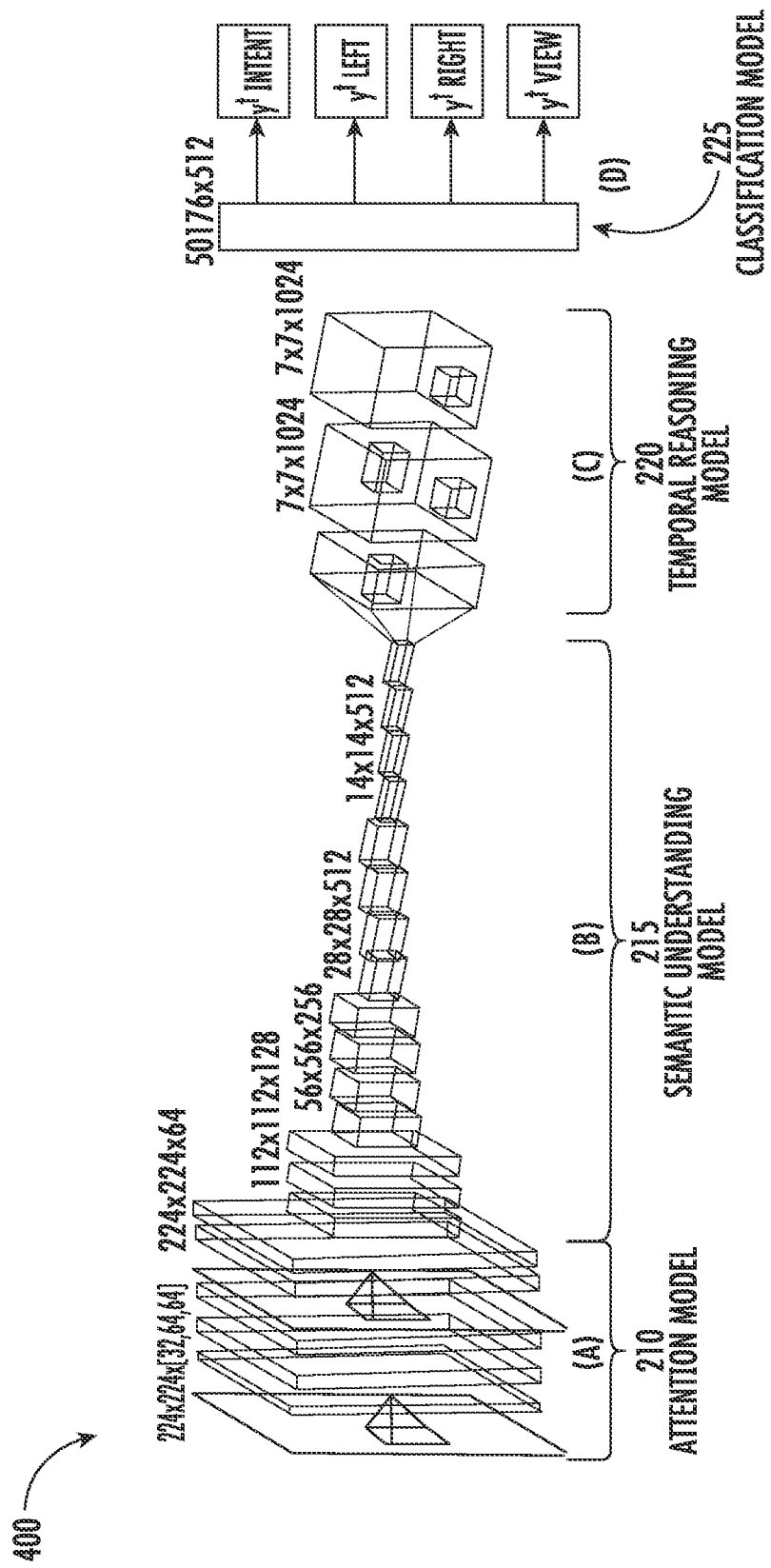
FIG. 4 depicts an example model architecture according to example implementations of the present disclosure.

Turning to FIG. 4, FIG. 4 depicts an example model architecture 400 according to example implementations of the present disclosure. The intention system 185 can utilize a variety of machine learned model configurations, for example, to determine the one or more temporal feature(s) 240 and the one or more spatial feature(s) 235. For example, in some implementations, the same machine learned model can be trained to determine the temporal feature(s) 240 and the spatial feature(s) 235. Additionally, or alternatively, the temporal feature(s) 240 can be determined separately from the spatial feature(s) 235. For instance, the temporal feature(s) 240 can be determined via a first machine learned model (e.g., a convolutional LSTM), while the spatial features 235 can be determined by a second machine learned model (e.g., a convolutional neural network). By way of example, the spatial and temporal feature(s) 235/240 can be factored into separate modules. Factorization, for example, can be utilized to more efficiently use available computing resources and increase performance.

Moreover, the temporal feature(s) 240 and the spatial feature(s) 235 can be determined sequentially or in parallel. For instance, the intention system 185 can input the one or more region(s) of interest 230 into two machine learned model(s) to determine the one or more temporal feature(s) 240 and the one or more spatial feature(s) 235 in parallel. In some implementations, the intention system 185 can sequentially determine the spatial feature(s) 235 and the temporal feature(s) 240 in a predetermined order. For example, the intention system 185 can first input the one or more region(s) 230 of interest into a machine learned model to determine the spatial feature(s) 235 and subsequently input the region(s) of interest 230 and the spatial feature(s) 235 into the same or a different machine learned model to determine the temporal feature(s) 240. In some implementations, the intention system 185 can first determine the temporal feature(s) 240 and subsequently determine the spatial feature(s) 235.

In some implementations, the intention system 185 can utilize a convolutional-recurrent architecture to classify an object intention 245 associated with the object of interest 310. For instance, the intention system 185 can utilize the convolutional-recurrent architecture to classify the state of turn signal(s) such as turn signals 320 and/or 330 associated with the vehicle of interest. In some implementations, the attention model 210 can predict an attention mask for each original input frame (e.g., region of interest 300) using a convolutional network (e.g., fully convolutional network). In addition, or alternatively, the spatial understanding model 215 can take the element-wise product with the original input image (e.g., region of interest 300) and extract spatial feature(s) 235 using a convolutional neural network (e.g., a VGG16-based convolutional neural network). The temporal reasoning model 220 can then incorporate one or more temporal feature(s) 240 using a convolutional network (e.g., a convolutional LSTM). In this manner, probability distributions associated with an object intention 245 can be predicted based on the spatial and temporal feature(s) 235/240. For example, the probability distributions can be predicted over temporal feature(s) 240 such as the state of turn signal(s) (e.g., 320/330) and/or spatial feature(s) 235 such as the view face (e.g., object orientation) of the object of interest 310.

Although the above description provides examples that discuss vehicles of interest 310, the intention system 185 is not limited to vehicles and can be applied to any object of interest 310 within vehicle's 105 surrounding environment. For example, in some implementations, the intention system 185 can be configured to determine the intention of one or more bicycle(s) within the surrounding environment of vehicle 105. For example, the attention model 210 can be configured to determine one or more region(s) of interest 230 including one or more bicycle(s) of interest 310 (e.g., using machine learned model(s) that have been trained to analyze signals associated with a bicycle). In some implementations, the region(s) of interest 230 can include one or more signal(s) (e.g., hand waves by an operator of a bicycle) associated with the bicycle(s) of interest 310. Moreover, the semantic understanding model 215 can determine one or more spatial feature(s) 235 associated with the region(s) of interest 230. For example, the spatial feature(s) 235 can include a bicycle orientation. In addition, the temporal reasoning model 220 can determine one or more temporal feature(s) 240 associated with the region(s) of interest 230. And, the classification model 225 can determine, based, at least in part, on the spatial feature(s) and temporal feature(s) 235/240, a bicycle intention associated with the bicycle of interest 310. Moreover, the intention model 185 can initiate one or more action(s) based on the bicycle intention. For example, an action can include outputting data for autonomous vehicle operation, providing data for display to an operator via the HMI 190, etc.

Figure 5:
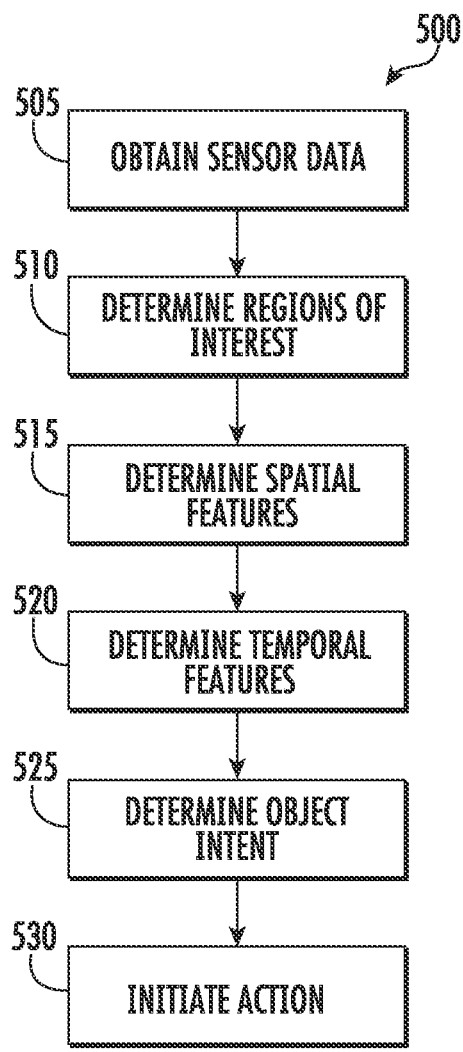
FIG. 5 depicts an example flow diagram of an example method for determining semantic object intentions according to example implementations of the present disclosure.

FIG. 5 depicts an example flow diagram of an example method 500 for determining semantic object intentions according to example implementations of the present disclosure. One or more portion(s) of the method 500 can be can be implemented by a computing system that includes one or more computing devices such as, for example, the computing systems described with reference to the other figures (e.g., the vehicle computing system 100, the intention system 185, the operations computing system 195, etc.). Each respective portion of the method 500 can be performed by any (or any combination) of one or more computing devices. Moreover, one or more portion(s) of the method 500 can be implemented as an algorithm on the hardware components of the device(s) described herein (e.g., as in FIGS. 1-2, 4, 6, and/or 7), for example, to determine an object intention 245 based on physical attributes. FIG. 5 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 5 is described with reference to elements/terms described with respect to other systems and figures for example illustrated purposes and is not meant to be limiting. One or more portions of method 500 can be performed additionally, or alternatively, by other systems.

At (505), the method 500 can include obtaining sensor data 140. For example, the intention system 185 can obtain sensor data 140 associated with a surrounding environment of a first vehicle (e.g., vehicle 105). For instance, an autonomous vehicle (e.g., vehicle 105) can obtain, via one or more vehicle sensors 125, sensor data 140 associated with a surrounding environment of the autonomous vehicle (e.g., vehicle 105). In some implementations, the sensor data 140 can include a sequence of image frames, each image frame corresponding to one of a plurality of time steps.

At (510), the method 500 can include determining region(s) of interest 230. For example, the intention system 185 can determine one or more region(s) of interest 230 associated with the sensor data 140. The one or more region(s) of interest 230 can include one or more cropped image frames associated with the object of interest 310. For instance, the one or more region(s) of interest 230 can include one or more cropped image frames associated with the vehicle of interest. In such an example, the one or more cropped image frame(s) can also include data indicative of one or more signal light(s) 320 and/or 330 associated with the vehicle of interest. By way of example, the intention system 185 can determine the one or more region(s) of interest 230 via one or more machine learning techniques. For example, determining the one or more region(s) of interest 230 can include inputting one or more image frames into a machine learned model.

At (515), the method 500 can include determining spatial feature(s) 235. For example, the intention system 185 can determine one or more spatial feature(s) 235 associated with at least one of the one or more region(s) of interest 230. In some implementations, the intention system 185 can determine the one or more spatial feature(s) 235 associated with at least one of the one or more region(s) of interest 230 via one or more machine learning models. For example, determining the one or more spatial feature(s) 235 can include inputting the one or more region(s) of interest 230 into at least one machine learned model.

In some implementations, at least one of the one or more spatial feature(s) 235 can be indicative of an object orientation associated with the object of interest 310. For example, at least one of the one or more spatial feature(s) 235 can be indicative of a vehicle orientation associated with the vehicle of interest. The vehicle orientation, for example, can be relative to a first vehicle (e.g., vehicle 105). Moreover, in some implementations, the one or more spatial feature(s) 235 can be indicative of a model representation of the vehicle of interest. The model representation of the vehicle of interest, for example, can be indicative of the vehicle orientation associated with the vehicle of interest.

In some implementations, at least one of the one or more spatial feature(s) 235 can be indicative of one or more occluding objects. The one or more occluding objects, for example, can include one or more object(s) disrupting the view of the object of interest 310. For example, the one or more occluding objects can include one or more object(s) disrupting the view of the vehicle of interest from a first vehicle (e.g., vehicle 105).

At (520), the method 500 can include determining temporal feature(s) 240. For example, the intention system 185 can determine one or more temporal feature(s) 240 associated with at least one of the one or more region(s) of interest 230. In some implementations, the intention system 185 can determine the one or more temporal feature(s) 240 associated with at least one of the one or more region(s) of interest 230 via one or more machine learning models. For example, determining the one or more temporal feature(s) 140 can include inputting a series of regions of interest 230 into at least one machine learned model.

In some implementations, the one or more temporal feature(s) 240 can be indicative of one or more semantic states associated with at least one signal of the object of interest 310. For example, the one or more temporal feature(s) 140 can be indicative of one or more semantic states associated with at least one signal light (e.g., signal light(s) 320 and/or 330 of the vehicle of interest). For instance, the semantic state(s) can include an indication of whether a signal light is "on" and/or "off" over a period of time and/or whether the signal light is occluded over a period of time (e.g., "unknown").

At (525), the method 500 can include determining intention associated with an object. For example, the intention system 185 can determine an object intention 245 associated with the object of interest 310. Moreover, the intention system 185 can determine an intention associated with the vehicle of interest. In some implementations, the intention system 185 can determine the intention associated with the object and/or vehicle of interest via one or more machine learning models. The object and/or vehicle intention can be based, at least in part, on the one or more spatial feature(s) 235 and the one or more temporal feature(s) 240. For example, determining the object and/or vehicle intention can include inputting the one or more spatial feature(s) 235 and the one or more temporal feature(s) 240 into at least one machine learned model. In some implementations, the region(s) of interest 230, spatial feature(s) 235, temporal feature(s) 240, and object and/or vehicle intention can be determined separately via one or more different machine learned models.

At (530), the method 500 can include initiating one or more action(s). For example, the intention system 185 can initiate one or more action(s) based, at least in part, on the intention. Moreover, in some implementations, the intention system 185 can initiate one or more action(s) based, at least in part, on the intention.

For instance, the one or more action(s) can include providing one or more informational prompt(s) to an operator of the first vehicle (e.g., vehicle 105). For example, an autonomous vehicle (e.g., vehicle 105) can include one or more output device(s) (e.g., HMI 190). The autonomous vehicle (e.g., vehicle 105) can provide, via the one or more output device(s), data indicative of the intention associated with the vehicle of interest to one or more operator(s) (e.g., operator 106) of the autonomous vehicle (e.g., vehicle 105). Moreover, the one or more action(s) can include generating a motion plan 180 for the autonomous vehicle (e.g., vehicle 105) based, at least in part, on the intention associated with a vehicle of interest. In addition, or alternatively, the one or more action(s) can further include initiating the one or more action(s) based, at least in part, on the motion plan 180.

Figure 6:
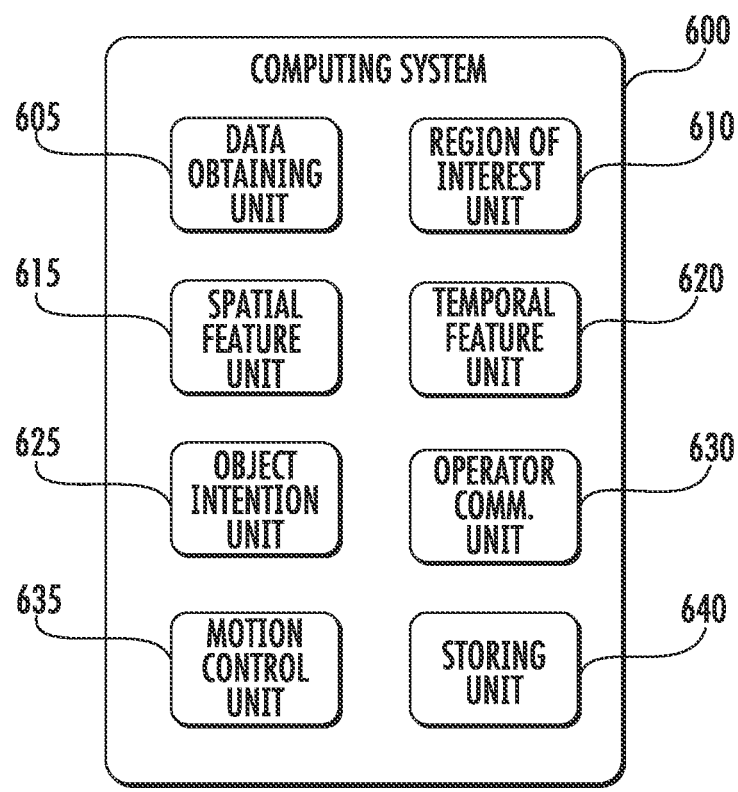
FIG. 6 depicts an example system with units for performing operations and functions according to example implementations of the present disclosure.

Various means can be configured to perform the methods and processes described herein. For example, FIG. 6 depicts an example system 600 that includes various means according to example embodiments of the present disclosure. The computing system 600 can be and/or otherwise include, for example, the intention system 185. The computing system 600 can include data obtaining unit(s) 605, region of interest unit(s) 610, spatial feature unit(s) 615, temporal feature unit(s) 620, object intention unit(s) 625, operator communication unit(s) 630, motion control unit(s) 635, storing unit(s) 640 and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s)) can be configured to obtain sensor data associated with a surrounding environment of a first vehicle (e.g., from one or more sensors onboard the first vehicle). As described herein, the sensor data can be indicative of a variety of information such as, for example, a sequence of image frames at each of a plurality of time steps.

The means (e.g., the region of interest unit(s) 610) can determine one or more region(s) of interest 230 associated with the sensor data 140. For example, the means (e.g., the region of interest unit(s) 610) can include an attention model 210 configured to analyze the sensor data 140 to determine one or more region(s) of interest 230. For instance, in some implementations, the means (e.g., the region of interest unit(s) 610) can utilize one or more machine learned models (e.g., attention model 210) to determine the one or more region(s) of interest 230. As described herein, the one or more region(s) of interest 230 can include one or more cropped image frames associated with the object of interest 310. For example, the one or more cropped image frames can include data indicative of one or more signal light(s) associated with the object of interest 310.

The means (e.g., the spatial feature unit(s) 615) can determine one or more spatial feature(s) 235 associated with at least one of the one or more region(s) of interest 230. For example, the means (e.g., the spatial feature unit(s) 615) can include a semantic understanding model 215 configured to determine one or more spatial feature(s) 235 associated with the region(s) of interest 230. For instance, in some implementations, the means (e.g., the spatial feature unit(s) 615) can utilize one or more machine learned models (e.g., semantic understanding model 215) to determine the one or more spatial feature(s) 235. As described herein, the spatial feature(s) 235 can include one or more object characteristics.

For example, the spatial feature(s) 235 can indicate an orientation of the object of interest 310. For instance, the spatial feature(s) 235 can indicate a vehicle orientation associated with the vehicle of interest. The means (e.g., the temporal feature unit(s) 620) can determine one or more temporal feature(s) 240 associated with at least one of the one or more region(s) of interest 230. For example, the means (e.g., the temporal feature unit(s) 620) can include a temporal reasoning model 220 configured to determine one or more temporal feature(s) 240 associated with at least one of the region(s) of interest 230. For instance, in some implementations, the means (e.g., the temporal feature unit(s) 620) can utilize one or more machine learned models (e.g., temporal reasoning model 220) to determine the one or more temporal feature(s) 240. As described herein, the temporal feature(s) 240 can be indicative of one or more semantic state(s) associated with the object of interest 310. For example, the semantic state(s) can be associated with at least one signal light (e.g., 320/330) of the vehicle of interest.

The means (e.g., the object intention unit(s) 625) can determine an object intention 245 associated with the object of interest 310 based, at least in part, on the one or more spatial feature(s) 235 and the one or more temporal feature(s) 240. For example, the means (e.g., the object intention unit(s) 625) can include a classification model 225 configured to determine an object intention 245. For instance, in some implementations, the means (e.g., the object intention unit(s) 625) can utilize one or more machine learned models (e.g., classification model 225) to determine an object intention 245. As described herein, the object intention 245 can include one or more future acts by the object of interest 310 (e.g., as intended). For instance, the object intention 245 can include a future left turn, right turn, and/or stop associated with the object of interest 310.

The means (e.g., operator communication unit(s) 630 and/or the motion control unit(s) 635) can initiate one or more actions based, at least in part, on the object intention 245. For example, the (e.g., operator communication unit(s) 630) can provide data indicative of the object intention 245 to one or more operators 106 (e.g., via at least one of a output device of the vehicle 105, an output device of a user device associated with the operator 106, HMI 190, etc.) of the vehicle 105. Moreover, the means (e.g., motion control unit(s) 635) can determine one or more motion plan(s) 180 based, at least in part, on the object intention 245. In addition, or alternatively, the means (e.g., motion control unit(s) 635) can initiate one or more action(s) based, at least in part, on the motion plan(s) 180. The means (e.g., storing unit(s) 640) can be configured for storing data. For instance, the means (e.g., the storing unit(s) 640) can be configured for storing data indicative of user input, object data, sensor data (e.g., sequence of image frames), region(s) of interest 230, spatial feature(s) 235, temporal feature(s) 240, object intention(s) 245, training data utilized to train one or more machine learned model(s), etc. in a memory.

These described functions of the means are provided as examples and are not meant to be limiting. The means can be configured for performing any of the operations and functions described herein.

Figure 7:
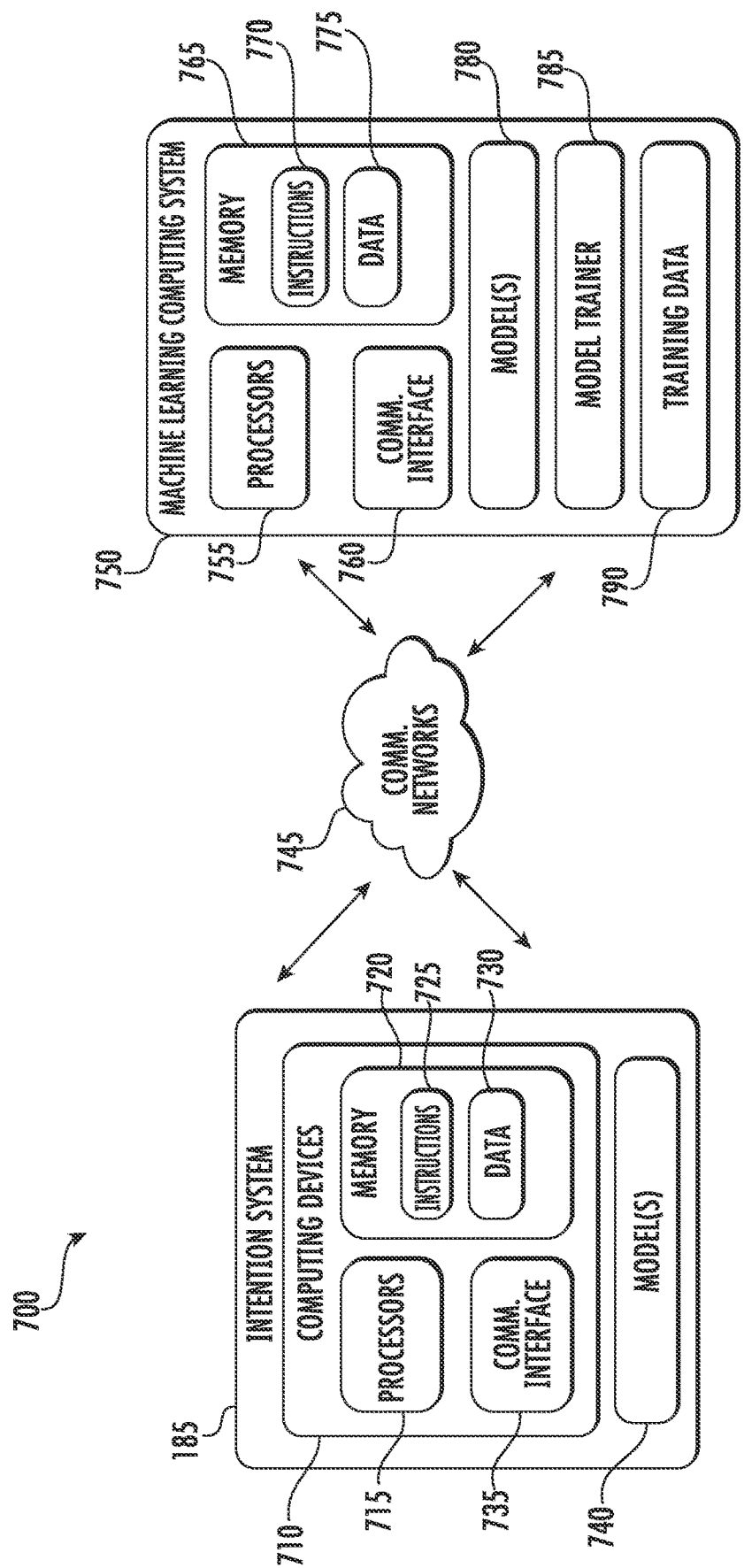
FIG. 7 depicts example system components of an example system according to example implementations of the present disclosure.

FIG. 7 depicts example system components of an example system 700 according to example implementations of the present disclosure. The example system 700 illustrated in FIG. 7 is provided as an example only. The components, systems, connections, and/or other aspects illustrated in FIG. 7 are optional and are provided as examples of what is possible, but not required, to implement the present disclosure. The example system 700 can include an intention system 185 and a machine learning computing system 750 that are communicatively coupled over one or more network(s) 745. As described herein, the intention system 185 can be implemented onboard a vehicle (e.g., as a portion of the vehicle computing system 100) and/or can be remote from a vehicle (e.g., as a portion of an operations computing system 195). In either case, a vehicle computing system 100 can utilize the operations and model(s) of the intention system 185 (e.g., locally, via wireless network communication, etc.).

The intention system 185 can include one or computing device(s) 710. The computing device(s) 710 of the intention system 185 can include processor(s) 715 and a memory 720. The one or more processor(s) 715 can be any suitable processing device (e.g., a processor core, a microprocessor, an ASIC, a FPGA, a controller, a microcontroller, etc.) and can be one processor or a plurality of processors that are operatively connected. The memory 720 can include one or more non-transitory computer-readable storage media, such as RAM, ROM, EEPROM, EPROM, one or more memory devices, flash memory devices, etc., and/or combinations thereof.

The memory 720 can store information that can be obtained by the one or more processor(s) 715. For instance, the memory 720 (e.g., one or more non-transitory computer-readable storage mediums, memory devices, etc.) can include computer-readable instructions 725 that can be executed by the one or more processors 715. The instructions 725 can be software written in any suitable programming language or can be implemented in hardware. Additionally, or alternatively, the instructions 725 can be executed in logically and/or virtually separate threads on processor(s) 715.

For example, the memory 720 can store instructions 725 that when executed by the one or more processors 715 cause the one or more processors 715 (e.g., of the intention system 185) to perform operations such as any of the operations and functions of the intention system 185 and/or for which the intention system 185 is configured, as described herein, the operations for determining object intent based on physical attributes (e.g., one or more portions of method 500), the operations and functions of any of the models described herein and/or for which the models are configured and/or any other operations and functions for the intention system 185, as described herein.

The memory 720 can store data 730 that can be obtained (e.g., received, accessed, written, manipulated, generated, created, stored, etc.). The data 730 can include, for instance, sensor data, input data, data indicative of machine-learned model(s), output data, sparse geographic data, and/or other data/information described herein. In some implementations, the computing device(s) 710 can obtain data from one or more memories that are remote from the intention system 185.

The computing device(s) 710 can also include a communication interface 735 used to communicate with one or more other system(s) (e.g., other systems onboard and/or remote from a vehicle, the other systems of FIG. 7, etc.). The communication interface 735 can include any circuits, components, software, etc. for communicating via one or more networks (e.g., 745). In some implementations, the communication interface 735 can include, for example, one or more of a communications controller, receiver, transceiver, transmitter, port, conductors, software and/or hardware for communicating data/information.

According to an aspect of the present disclosure, the intention system 185 can store or include one or more machine-learned models 740. As examples, the machine-learned model(s) 740 can be or can otherwise include various machine-learned model(s) such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks, etc.), recurrent neural networks (e.g., long short-term memory recurrent neural networks, etc.), and/or other forms of neural networks. The machine-learned models 740 can include the machine-learned models described herein with reference to FIGS. 2, and 4-6.

In some implementations, the intention system 185 can receive the one or more machine-learned models 740 from the machine learning computing system 750 over the network(s) 745 and can store the one or more machine-learned models 740 in the memory 720 of the intention system 185. The intention system 185 can use or otherwise implement the one or more machine-learned models 740 (e.g., by processor(s) 715). In particular, the intention system 185 can implement the machine learned model(s) 740 to determine object intent based on physical attributes, as described herein.

The machine learning computing system 750 can include one or more processors 755 and a memory 765. The one or more processors 755 can be any suitable processing device (e.g., a processor core, a microprocessor, an ASIC, a FPGA, a controller, a microcontroller, etc.) and can be one processor or a plurality of processors that are operatively connected. The memory 765 can include one or more non-transitory computer-readable storage media, such as RAM, ROM, EEPROM, EPROM, one or more memory devices, flash memory devices, etc., and/or combinations thereof.

The memory 765 can store information that can be accessed by the one or more processors 755. For instance, the memory 765 (e.g., one or more non-transitory computer-readable storage mediums, memory devices, etc.) can store data 775 that can be obtained (e.g., generated, retrieved, received, accessed, written, manipulated, created, stored, etc.). In some implementations, the machine learning computing system 750 can obtain data from one or more memories that are remote from the machine learning computing system 750.

The memory 765 can also store computer-readable instructions 770 that can be executed by the one or more processors 755. The instructions 770 can be software written in any suitable programming language or can be implemented in hardware. Additionally, or alternatively, the instructions 770 can be executed in logically and/or virtually separate threads on processor(s) 755. The memory 765 can store the instructions 770 that when executed by the one or more processors 755 cause the one or more processors 755 to perform operations. The machine learning computing system 750 can include a communication interface 760, including devices and/or functions similar to that described with respect to the intention system 185.

In some implementations, the machine learning computing system 750 can include one or more server computing devices. If the machine learning computing system 750 includes multiple server computing devices, such server computing devices can operate according to various computing architectures, including, for example, sequential computing architectures, parallel computing architectures, or some combination thereof.

In addition, or alternatively to the model(s) 740 at the intention system 185, the machine learning computing system 750 can include one or more machine-learned model(s) 780. As examples, the machine-learned model(s) 780 can be or can otherwise include various machine-learned models such as, for example, neural networks (e.g., deep neural networks), support vector machines, decision trees, ensemble models, k-nearest neighbors models, Bayesian networks, or other types of models including linear models and/or non-linear models. Example neural networks include feed-forward neural networks (e.g., convolutional neural networks), recurrent neural networks (e.g., long short-term memory recurrent neural networks, etc.), and/or other forms of neural networks. The machine-learned models 780 can be similar to and/or the same as the machine-learned models 740, and/or any of the models discussed herein with reference to FIGS. 2, 4-6.

As an example, the machine learning computing system 750 can communicate with the intention system 185 according to a client-server relationship. For example, the machine learning computing system 750 can implement the machine-learned models 780 to provide a web service to the intention system 185 (e.g., including on a vehicle, implemented as a system remote from the vehicle, etc.). For example, the web service can provide machine-learned models to an entity associated with a vehicle; such that the entity can implement the machine-learned model (e.g., to determine object intent, etc.). Thus, machine-learned models 780 can be located and used at the intention system 185 (e.g., on the vehicle 105, at the operations computing system 195, etc.) and/or the machine-learned models 780 can be located and used at the machine learning computing system 750.

In some implementations, the machine learning computing system 750 and/or the intention system 185 can train the machine-learned model(s) 740 and/or 780 through the use of a model trainer 785. The model trainer 785 can train the machine-learned models 740 and/or 780 using one or more training or learning algorithm(s). One example training technique is backwards propagation of errors. In some implementations, the model trainer 785 can perform supervised training techniques using a set of labeled training data. In other implementations, the model trainer 785 can perform unsupervised training techniques using a set of unlabeled training data. The model trainer 785 can perform a number of generalization techniques to improve the generalization capability of the models being trained. Generalization techniques include weight decays, dropouts, or other techniques.

In some implementations, the model trainer 785 can utilize loss function(s) to train the machine-learned model(s) 740 and/or 780. For example, multi-task loss can be used to teach a model(s) (e.g., 740 and/or 780) utilized to detect region(s) of interest 230, spatial feature(s) 235, temporal feature(s) 240, and/or object intention(s) 245. By way of example, a weighted cross entropy loss over defined tasks can be employed. For example, in some implementations, given model inputs x, ground truth labels ŷ, model weights θ, task weights γ and network function σ(•), the loss can be defined as:

$$\mathcal{L}(\hat{y},x|\theta) = \ell_{intent}(\hat{y},x|\theta) + \ell_{left}(\hat{y},x|\theta) + \ell_{right}(\hat{y},x|\theta) + \ell_{view}(\hat{y},x|\theta)$$

where each task loss can use cross-entropy and is defined as:

$$\ell(\hat{y}, x \mid \theta) = \gamma \sum_c \hat{y}_c \log(\sigma_c(x \mid \theta))$$

For example, the loss can be defined in terms of a sum over the task space, which can include: l(intent), (e.g., the loss over the high level understanding of the actor); l(left) and l(right), (e.g., the losses over the left and right turn signals, respectively); and l(view), (e.g., the loss over the face of the actor that is seen).

The model trainer 780 can train a machine-learned model (e.g., 740 and/or 780) based on a set of training data 790. The training data 790 can include, for example, labeled datasets (e.g., turn signal classification datasets, etc.). By way of example, 1,257,591 labeled frames (e.g., image frames) including over 10,000 vehicle trajectories recorded over an autonomous driving platform at 10 Hz in terms of the state of turn signals can be used. In such an example, each frame can be labeled for a left turn and right turn light in terms of "on," "off," or "unknown." In some implementations, the label(s) can identify the conceptual state of each light, with "on" indicating that the signal is active even when the light bulb is not illuminated. From these labels, a high-level action such as object intent can be inferred.

The training data 790 can be taken from the same vehicle as that which utilizes the model(s) 740 and/or 780. Accordingly, the model(s) 740 and/or 780 can be trained to determine outputs in a manner that is tailored to that particular vehicle. Additionally, or alternatively, the training data 790 can be taken from one or more different vehicles than that which is utilizing the model(s) 740 and/or 780. The model trainer 785 can be implemented in hardware, firmware, and/or software controlling one or more processors. Additionally, or alternatively, other data sets can be used to train the model(s) (e.g., models 740 and/or 780) including, for example, publicly accessible datasets (e.g., labeled data sets, unlabeled data sets, etc.).

To train the model(s) (e.g., models 740 and/or 780), Adam optimization with a learning rate of $1 \times 10^{-4}$, $\beta_1=0.9$, and $\beta_2=0.999$ can be utilized. Moreover, the learning rate on plateau can be reduced, multiplying it by a factor of 0.1 if 5 epochs go by without changing the loss by more than $1 \times 10^{-3}$. A weight decay of $1 \times 10^{-4}$ and dropout with p=0.5 can be used in fully connected layers (e.g., those used to classify object intention 245) for regularization. In some implementations, training mini-batches can be sampled using a stratified scheme that counteracts class imbalance. For example, training can be limited to 50 epochs and selection can be done according to validation metrics. Additionally, or alternatively, data augmentation can be utilized, for example, random mirroring and color jittering can be applied to input sequences (e.g., sequence of image frames).

In this way, the model(s) 740 and/or 780 can be designed to determine object intention 245 by learning to determine correlating spatial and temporal feature(s) 235/240 from sensor data 140. For example, the model(s) 740 and/or 780 can learn to determine an object intention 245 based, at least in part, on determined spatial and temporal feature(s) 235/240 associated with sensor data 140 including one or more image frames.

The network(s) 745 can be any type of network or combination of networks that allows for communication between devices. In some embodiments, the network(s) 745 can include one or more of a local area network, wide area network, the Internet, secure network, cellular network, mesh network, peer-to-peer communication link and/or some combination thereof and can include any number of wired or wireless links. Communication over the network(s) 745 can be accomplished, for instance, via a network interface using any type of protocol, protection scheme, encoding, format, packaging, etc.

FIG. 7 illustrates one example system 700 that can be used to implement the present disclosure. Other computing systems can be used as well. For example, in some implementations, the intention system 185 can include the model trainer 785 and the training dataset 790. In such implementations, the machine-learned models 740 can be both trained and used locally at the intention system 185 (e.g., at the vehicle 105).

Computing tasks discussed herein as being performed at computing device(s) remote from the vehicle 105 can instead be performed at the vehicle 105 (e.g., via the vehicle computing system 100), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A computer-implemented method, comprising:
   obtaining sensor data associated with a surrounding environment of a first vehicle, wherein the sensor data comprises a sequence of image frames respectively corresponding to one of a plurality of time steps;
   determining one or more regions of interest associated with the sensor data;
   determining a model representation of an object associated with at least one of the one or more regions of interest, the model representation indicating an orientation of the object;
   determining one or more features associated with at least one of the one or more regions of interest, wherein the one or more features are indicative of one or more states associated with at least one signal of the object;
   determining an intention indicative of a predicted future action of the object based on the model representation and the one or more features; and
   initiating one or more actions based on the intention.

2. The computer-implemented method of claim 1, wherein the object comprises a second vehicle.

3. The computer-implemented method of claim 2, wherein the signal of the object is at least one signal light of the second vehicle, and wherein at least one of the one or more features is a temporal feature indicative of one or more states associated with the at least one signal light of the second vehicle.

4. The computer-implemented method of claim 1, wherein the object comprises a bicycle.

5. The computer-implemented method of claim 4, wherein the signal comprises a hand wave by an operator of the bicycle.

6. The computer-implemented method of claim 1, wherein determining the intention indicative of the predicted future action of the object comprises determining the intention using a machine learned model, wherein the one or more features are input into the machine learned model.

7. The computer-implemented method of claim 1, wherein the one or more regions of interest comprises one or more cropped image frames associated with the object.

8. The computer-implemented method of claim 7, wherein the one or more cropped image frames comprise data indicative of the at least one signal of the object.

9. The computer-implemented method of claim 1, further comprising:
determining one or more spatial features associated with at least one of the one or more regions of interest, wherein at least one of the one or more spatial features is indicative of the orientation of the object.

10. A computing system comprising:
one or more processors;
one or more tangible, non-transitory, computer readable media that store instructions that are executable by the one or more processors to perform operations comprising:
obtaining sensor data associated with a surrounding environment of a first vehicle, wherein the sensor data comprises a sequence of image frames respectively corresponding to one of a plurality of time steps;
determining one or more regions of interest associated with the sensor data;
determining a model representation of an object associated with at least one of the one or more regions of interest, the model representation indicating an orientation of the object;
determining one or more features associated with at least one of the one or more regions of interest, wherein the one or more features are indicative of one or more states associated with at least one signal of the object;
determining an intention indicative of a predicted future action of the object based on the model representation and the one or more features; and
initiating one or more actions based on the intention.

11. The computing system of claim 10, wherein determining the one or more features comprises inputting a series of images of the one or more regions of interest into a machine learning model.

12. The computing system of claim 10, wherein determining the intention associated with the object comprises inputting the one or more features into a machine learning model.

13. The computing system of claim 10, wherein the orientation of the object is relative to an additional object within a surrounding environment of the first vehicle.

14. The computing system of claim 10, wherein determining the one or more regions of interest comprises inputting the sequence of image frames into one or more machine learning models.

15. The computing system of claim 10, wherein the features and the intention are respectively determined by different machine learned models of one or more machine learned models.

16. A vehicle comprising:
one or more vehicle sensors:
one or more processors; and
one or more tangible, non-transitory, computer readable media that store instructions that are executable by the one or more processors to perform operations comprising:
obtaining sensor data associated with a surrounding environment of the vehicle, wherein the sensor data comprises a sequence of image frames respectively corresponding to one of a plurality of time steps;
determining one or more regions of interest associated with the sensor data;
determining a model representation of an object associated with at least one of the one or more regions of interest, the model representation indicating an orientation of the object;
determining one or more features associated with at least one of the one or more regions of interest, wherein the one or more features are indicative of one or more states associated with at least one signal of the object;
determining an intention indicative of a predicted future action of the object based on the model representation and the one or more features; and
initiating one or more actions based on the intention.

17. The vehicle of claim 16, wherein the vehicle is an autonomous vehicle.

18. The vehicle of claim 16, wherein the operations further comprise:
generating a motion plan for the vehicle based on the intention.

19. The vehicle of claim 18, wherein initiating the one or more actions is based on the motion plan.

20. The vehicle of claim 16, wherein the vehicle further comprises one or more output devices, and wherein the operations further comprise:
providing, via the one or more output devices, data indicative of the intention to one or more operators of the vehicle.

* * * * *